United States Patent [19]
Ramesh

[11] Patent Number: 5,843,502
[45] Date of Patent: Dec. 1, 1998

[54] PACKAGE HAVING COOKED FOOD PRODUCT PACKAGED IN FILM HAVING FOOD ADHESION LAYER CONTAINING HIGH VICAT SOFTENING POINT OLEFIN/ACRYLIC ACID COPOLYMER

[75] Inventor: Ram Kumar Ramesh, Greenville, S.C.

[73] Assignee: Cryovac, Inc., Duncan, S.C.

[21] Appl. No.: 669,728

[22] Filed: Jun. 26, 1996

[51] Int. Cl.$^6$ ............................ A21D 10/02; B65B 55/00; A23B 4/10
[52] U.S. Cl. ............................ 426/127; 426/113; 426/125; 426/129; 426/392; 426/410; 426/412; 426/415; 426/420
[58] Field of Search ........................... 152/272; 204/168; 428/35.9, 34.9, 212, 246; 426/106, 109, 113, 125, 129, 127, 392, 410, 412, 420, 442, 415, 523

[56] References Cited

U.S. PATENT DOCUMENTS

| | | | |
|---|---|---|---|
| 3,355,319 | 11/1967 | Rees | 117/122 |
| 3,369,911 | 2/1968 | Von Witzleben | 99/176 |
| 3,845,163 | 10/1974 | Murch | 260/857 |
| 4,064,296 | 12/1977 | Bornstein et al. | 428/35 |
| 4,120,716 | 10/1978 | Bonet | 156/272 |
| 4,287,151 | 9/1981 | Esakov et al. | 264/560 |
| 4,302,565 | 11/1981 | Goeke et al. | 526/88 |
| 4,302,566 | 11/1981 | Karol et al. | 526/125 |
| 4,411,919 | 10/1983 | Thompson | 426/412 |
| 4,469,742 | 9/1984 | Oberle et al. | 428/215 |
| 4,568,580 | 2/1986 | Ghirardello et al. | 428/35 |
| 4,606,922 | 8/1986 | Schirmer | 426/412 |
| 4,855,183 | 8/1989 | Oberle | 428/345 |
| 4,879,430 | 11/1989 | Hoffman | 428/35.1 |
| 5,051,266 | 9/1991 | Juhl et al. | 426/129 |
| 5,206,075 | 4/1993 | Hodgson, Jr. | 428/216 |
| 5,213,900 | 5/1993 | Friedrich | 428/474.4 |
| 5,241,031 | 8/1993 | Mehta | 526/348.1 |
| 5,272,236 | 12/1993 | Lai et al. | 526/348.5 |
| 5,278,272 | 1/1994 | Lai et al. | 526/348.5 |
| 5,300,353 | 4/1994 | Yoshimura et al. | 428/213 |
| 5,534,277 | 7/1996 | Ramesh | 426/129 |

FOREIGN PATENT DOCUMENTS

| | | |
|---|---|---|
| 2038757 | 7/1991 | Canada . |
| 127 296 | 4/1984 | European Pat. Off. . |
| 450 435 | 3/1991 | European Pat. Off. . |
| 453 925 | 4/1991 | European Pat. Off. . |
| 589 431 | 9/1993 | European Pat. Off. . |
| WO 90/03414 | 4/1990 | WIPO . |
| WO 91/08152 | 6/1991 | WIPO . |
| WO 93/03093 | 2/1993 | WIPO . |

OTHER PUBLICATIONS

Annual Book of ASTM Standards, D1525, pp. 337–342 "Standard Test Method for Vicat Softening Temperature of Plastics".

Annual Book of ASTM Standards, D2732, pp. 368–371, "Standard Test Method for Unretrained Linear Thermal Shrinkage of Plastic Film and Sheeting".

DuPont, Nucrel Resins Product Information 0407, 0411HS, 0609HS, 0902HC, 0903, 0903HC, 0910, 0910HS, 1202HC, 1207, 1214, 1214SR and 2990 dated Dec. 1989, and Nucrel 31001 dated Mar. 1996.

Journal of Polymer Science, vol. 20, pp. 441–455 (1982), Wild et al., "Determination of Branching Polyethylene and Ehtylene Copolymers".

Physical Property Comparisons of Primacor Adhesive Polymer, Apr. 1989, Dow Chemical Company pp. 6&7 and Forms 305–01619–389SMG, 305–01621–389SMG, 305–01622–389SMG and 305–01620–389SMG.

"Relative Properties of Surlyn Ionomer Grades", 1 page, Date Unknown.

Primary Examiner—W. Gary Jones
Assistant Examiner—Debra Shoemaker
Attorney, Agent, or Firm—Rupert B. Hurley, Jr.

[57] ABSTRACT

A packaged product has a film configured around a cooked meat product. The cooked meat product is adhered to a meat-contact surface of the film. The meat-contact surface of the film comprises an olefin/acrylic acid copolymer having a Vicat softening point, in °F., of at least 232 minus 5 multiplied by the weight percent of acrylic acid mer in the olefin/acrylic acid copolymer. The cooked meat product comprises at least one member selected from the group consisting of sausage, bologna, mortadella, braunschweiger, and high-wateradded added ham. The olefin/acrylic acid copolymer has been found to adhere well to high fat/low protein meat products is orientable for the formation of heat-shrinkable films, and provides a stronger seal than previously available olefin/acrylic acid copolymers.

33 Claims, 6 Drawing Sheets

PACKAGE HAVING COOKED FOOD PRODUCT PACKAGED IN FILM HAVING FOOD ADHESION LAYER CONTAINING HIGH VICAT SOFTENING POINT OLEFIN/ACRYLIC ACID COPOLYMER

Field of the Invention

The present invention relates generally to packaged products in which a film surrounds a cooked meat product. The present invention is also directed to processes for packaging. The present invention is particularly related to a packaged cooked meat product comprising ham, sausage, mortadella, bologna, and braunschweiger.

Background of the Invention

The food packaging industry uses packaging films from which bags and casings are made which are such that they may be used in cook-in applications, i.e, uses in which a food product is packaged in the film, following which the food product is cooked while packaged in the film. The term "cook-in," as used herein with respect to packaging materials such as films, refers to packaging material structurally capable of withstanding exposure to cook-in time-temperature conditions while surrounding a food product. Cook-in foods are foods cooked in the package in which they are distributed to the consumer and from which they may be consumed, with or without warming. Cook-in time-temperature conditions typically refer to a long slow cook, for example submersion in hot water at 131° F. to 149° F. for 1–4 hours. However, cook-in can include submersion at 158° F. to 212° F. for up to about 12 hours.

During cook-in, the package should maintain seal integrity,. i.e. any heat-sealed seams should resist being pulled apart during cook-in. Preferably, the film is heat sealable to itself. Additionally, the packaging film substantially conforms to the packaged food product. Preferably, this substantial conformability is achieved by the film being heat shrinkable under these conditions so as to form a tightly fitting package. In other words, in an advantageous embodiment, the film is heat-shrinkable under time-temperature conditions of cook-in, i.e., the film possesses sufficient shrink energy such that submerging the packaged food product in hot water will shrink the packaging film snugly around the packaged product, representatively up to about 55% monoaxial or biaxial shrinkage at 185° F. Also, during cook-in the film should have food product adherence to restrict "cook-out," i.e. the collection of juices between the surface of the contained food product and the meat-contact surface of the packaging material. In this manner, product yield is increased by the food product retaining moisture.

Various meat products, such as ham, sausage, poultry, mortadella, bologna, braunschweiger, etc. are prepared as cook-in products. However, these products vary substantially in fat content and protein content. It is more difficult to obtain adequate film-to-meat adhesion for products which are high in fat, or products which are low in protein content, or products which have substantial levels of additives (starch and other fillers, water, etc.) as it is believed that it is the polar sites of the protein molecule which are attracted to polar sites on the film surface, which results in film-to-meat adhesion. For example, since poultry has a relatively low fat content and hence a relatively high protein content, with poultry it is relatively easy to obtain adequate film-to-meat adhesion.

However, it is more difficult to obtain adequate film-to-meat adhesion for such higher fat, lower protein meat products as ham, sausage, mortadella, bologna, and braunschweiger; especially sausage, mortadella, bologna, and braunschweiger. Cook-in packaging of these higher fat, lower protein meats has utilized a film having a polyamide meat contact layer, so that the polar groups on the polyamide produced an adequate level of film-to-meat adhesion to prevent substantial purge during the cook-in process. Moreover, the relatively high Vicat softening point of many polyamides permits cook-in to take place without substantial risk of failure of heat seals present in the package. Other polymers which have been used in cook-in packaging for meat products includes ionomer, ethylene/acrylic acid copolymer, and ethylene/methacrylic acid copolymer.

However, polyamide is an expensive polymer, at least with respect to most olefin-based polymers and copolymers. Ethylene/methacrylic acid copolymer, ethylene/acrylic acid copolymer and their metal-salt neutralized counterparts (e.g. SURLYN® ionomer resins) have been well known for several years to be the best of the known meat-adhering polyolefin materials. Metal-salt-neutralized ethylene/methacrylic acid copolymers (e.g., the SURLYN® 1650 ionomer resin used in CN510 (TM) film), especially have been the subject of wide commercial use in cook-in applications. However, even SURLYN® ionomer resins have been known to have unacceptable adhesion to products such as liversausage, bologna and mortadella. Furthermore, ethylene/methacrylic acid copolymer, ethylene/acrylic acid copolymer and their metal-salt neutralized counterparts have, in the past, exhibited less than adequate seal strength for use in cook-in bag and backseamed casing applications. This is because these copolymers have possessed relatively low Vicat softening points which causes undesirable performance in cook-in end use, as the seals tend to fail during cook-in. Though this can occur in both applications in which the seal is supported during cook-in (e.g., cooking in a mold), as well as in applications in which the seal is not supported during cook-in (e.g., cooking on a rack), seal failure is more prevalent in unsupported cook-in applications.

Furthermore, the relatively high acrylic acid mer content of the ethylene/acrylic acid copolymers used in the meat-adhesion layer of these film causes film blocking problems, i.e., a film tubing having such copolymer on the inside surface thereof tends to adhere to itself during storage conditions, i.e. when the film tubing is stored in lay-flat configuration, thereby rendering the film unfit for use.

Thus, it would be desirable to provide a packaged product in which the film has adequate film-to-meat adhesion to prevent substantial purge for high-fat/low-protein products, while providing adequate seal strength during cook-in and while also being more economical relative to polyamides. It would also be desirable that such a film have good heat-shrink characteristics, to further assist the film in becoming and remaining snug to the food product before, during, and after the cook-in process.

SUMMARY OF THE INVENTION

The present invention utilizes a film having a food-contact layer which permits a high level of heat-shrinkability, while providing high seal strength, and high film-to-meat adhesion, all at a cost substantially below the cost of a corresponding film having a polyamide food-contact layer. The present invention utilizes a food-contact layer comprising a new type of ethylene/acrylic acid copolymer (EAA copolyiners) which has only been available for a short period of time, and which has a higher Vicat softening point than EAA copolymers which have previously been available. This new EAA copolymer has surprisingly been found to provide a significantly higher level of film-to-meat adhesion for high-fat/low-protein meat products, such as sausage, mortadella, bologna, braunschweiger, and has also been discovered to provide a higher seal strength during cook-in. Also, the tendency of the film to block (as described above) has been discovered to be low. Moreover, it has been discovered that this new EAA copolymer does not prohibit the making of a multilayer film having a relatively high level of heat-shrinkability.

As a first aspect, the present invention is directed to a packaged product comprising a film configured around a cooked meat product. The cooked meat product is adhered to a meat-contact surface of the film. The meat-contact surface of the film comprises an olefin/acrylic acid copolymer having a Vicat softening point, in °F., of at least 232 minus (5.0 times the weight percent acrylic acid mer in the olefin/acrylic acid copolymer). The cooked meat product comprises at least one member selected from the group consisting of sausage, bologna, mortadella, braunschweiger, and ham.

Preferably, the olefin comprises ethylene, and the cooked meat product comprises at least one member selected from the group consisting of sausage, bologna, mortadella, braunschweiger, and ham-and-water product.

Preferably, the ethylene/acrylic acid copolymer has a Vicat softening point, in °F. of at least:

232−4.5 (percent acrylic acid mer content), and the ethylene/acrylic acid copolymer comprises acrylic acid mer in an amount of from about 1 to 30 percent. based on the weight of the copolymer, more preferably, the ethylene/acrylic acid copolymer has a Vicat softening point, in °F., of at least:

232−4.0 (percent acrylic acid mer content), and the ethylene/acrylic acid copolymer comprises acrylic acid mer in an amount of from about 3 to 20 percent., based on the weight of the copolymer, still more preferably, the ethylene/acrylic acid copolymer has a Vicat softening point, in °F., of at least:

232−3.5 (percent acrylic acid mer content), and the ethylene/acrylic acid copolymer comprises acrylic acid mer in an amount of from about 5 to 15 percent, based on the weight of the copolymer.

Although the film can be a monolayer film, preferably the film is a multilayer film. In the multilayer film, preferably the olefin/acrylic acid copolymer is present in a first film layer, with the multilayer film further comprising a second layer comprising at least one member selected from the group consisting of polyolefin, polystyrene, polyamide, polyester, polymerized ethylene vinyl alcohol, polyvinylidene chloride, polyether, polyurethane, polycarbonate, and starch-containing polymer. A first preferred multilayer film further comprises a third layer between the first layer and the second layer, the third layer serving as an $O_2$-barrier layer and comprising at least one member selected from the group consisting of polymerized ethylene vinyl alcohol, polyvinylidene chloride, polyamide, polyalkylene carbonate and polyester.

In a preferred multilayer film, the second layer comprises a polyamide, and the film further comprises a core third layer, between the first layer and the second layer, the third layer comprising at least one member selected from the group consisting of ethylene vinyl alcohol copolymer and ethylene/alpha-olefin copolymer. Preferably, this multilayer film further comprises: (a) a fourth layer between the first layer and the third layer, the fourth layer comprising at least one member selected from the group consisting of polyolefin, polystyrene, polyamide, polyester, polymerized ethylene vinyl alcohol, polyvinylidene chloride, polyether, polyurethane, polycarbonate, and starch-containing polymer; and (b) a fifth layer between the first layer and the fourth layer, the fifth layer serving as a tie layer and comprising anhydride-grafted polyolefin. Preferably, the multilayer film further comprises: (c) a sixth layer which is an outer film layer and which comprises polyamide and; (d) a seventh layer which serves as a tie layer and which is between the second layer and the sixth layer. Preferably, the multilayer film further comprises: (e) an eighth layer between the sixth layer and the seventh layer, the eighth layer comprising polyamide and (f); a core ninth layer, between the first layer and the fifth layer, comprising at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer.

In another preferred multilayer film, the second layer comprises at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer. Preferably, this multilayer film comprises a third layer between the first layer and the second layer, the third layer comprising at least one member selected from the group consisting of polymerized ethylene vinyl alcohol (EVOH), polyvinylidene chloride, polyamide, polyester and polyalkylene carbonate. Preferably, this multilayer film further comprises a fourth layer between the second layer and the third layer, the fourth layer serving as a tie layer and comprising at least one member selected from the group consisting of modified ethylene/alpha-olefin copolymer, modified ethylene/unsaturated ester copolymer, modified ethylene/unsaturated acid copolymer, polystyrene and polyurethane. Preferably, the multilayer film further comprises: a fifth layer between the first layer and the third layer, the fifth layer comprising at least one member selected from the group consisting of polyolefin, polyamide polyester, and polyurethane; and a sixth layer between the third layer and the fifth layer, the sixth layer serving as a tie layer, the sixth layer comprising at least one member selected from the group consisting of modified ethylene/alpha-olefin copolymer, modified ethylene/unsaturated ester copolymer, modified ethylene/unsaturated acid copolymer, polystyrene and polyurethane. Preferably, the meat-contact surface of the film is corona treated. The meat-contact layer may be sealed to itself. The second layer may be an outer layer, in combination with the meat-contact layer being sealed to the second layer, and optionally, with the second layer being corona treated. More preferably, the fifth layer comprises at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer. Alternatively, the multilayer film may further comprise: a seventh layer comprising at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer, and an eighth layer comprising at least one member selected from the group consisting of polyamide, polyester and thermoplastic elastomer. Preferably, the eighth layer comprises at least one member selected from the group consisting of polyamide 6, polyamide 11, polyamide 12, polyamide 66, polyamide 69, polyamide 610, polyamide 612, polyamide 6I, polyamide 6T, MXD6, and copolymers thereof. More preferably, the eighth layer comprises polyamide 6. The film may be biaxially oriented. The film may have a transverse direction free shrink of less than 10 percent at a temperature of 185° F. Alternatively, the film may have a machine direction free shrink of at least 10 percent at a temperature of 185° F., and a transverse direction free shrink of at least about 10 percent at a temperature of 185° F. Preferably, this latter film is at least partially cross-linked.

As a second aspect, the present invention is directed to a process comprising packaging a meat product in a package by encasing the meat product in a film, followed by cooking the meat product within the film so that a meat-contact surface of the film adheres to the meat product. The meat-contact surface of the film comprises an olefin/acrylic acid copolymer having a Vicat softening point, in °F., of at least 232–5.0 (percent acrylic acid mer content), and the cooked meat product comprises at least one member selected from the group consisting of sausage, bologna, mortadella, and braunschweiger, and ham (preferably, ham-and-water product). Preferably, the process is carried out in a manner which results in a preferred packaged product according to the present invention.

As a third aspect, the present invention is directed to a process comprising packaging a meat product in a hermetically heat-sealed, biaxially oriented film, followed by cooking the meat product with the film so that the meat-contact surface of the film adheres to the meat product. The meat-contact surface of the film comprises an olefin/acrylic acid copolymer having a Vicat softening point, in °F., of at least: 232–5.0 (percent acrylic acid mer content). The cooked meat product comprises at least one member selected from the group consisting of sausage, bologna, mortadella, braunschweiger, poultry, and ham. Preferably, the film has a machine direction free shrink of at least 10 percent at a temperature of 185° F., and a transverse direction free shrink of at least about 10 percent at a temperature of 185° F. Preferably, the film is a multilayer film and the olefin/acrylic acid copolymer is present in a first film layer which makes up at least 10 weight percent of a total weight of the multilayer film. Preferably, the film is at least partially cross-linked. Preferably, the olefin/acrylic acid copolymer comprises ethylene/acrylic acid copolymer comprising less than 10% acrylic acid mer, and wherein an external surface of the cooked meat product has been subjected to a temperature of at least 160° F. for at least 30 minutes. Preferably, the first film layer further comprises antioxidant.

DETAILED DESCRIPTION OF THE INVENTION

As used herein, the phrase "acrylic acid mer" is inclusive of mer units derived from acrylic acid and homologues thereof, e.g., acrylic acid and methacrylic acid, as well as higher homologues thereof.

Until recently, the only available copolymers of ethylene and acrylic acid have had a Vicat softening point ("VSP") which fell below the line of the following equation:

$$\text{Vicat Softening Point (°F.)} = 232° \text{ F.} - (5.0 \times \text{wt. \% acrylic acid mer in the copolymer}).$$

Figure 12:
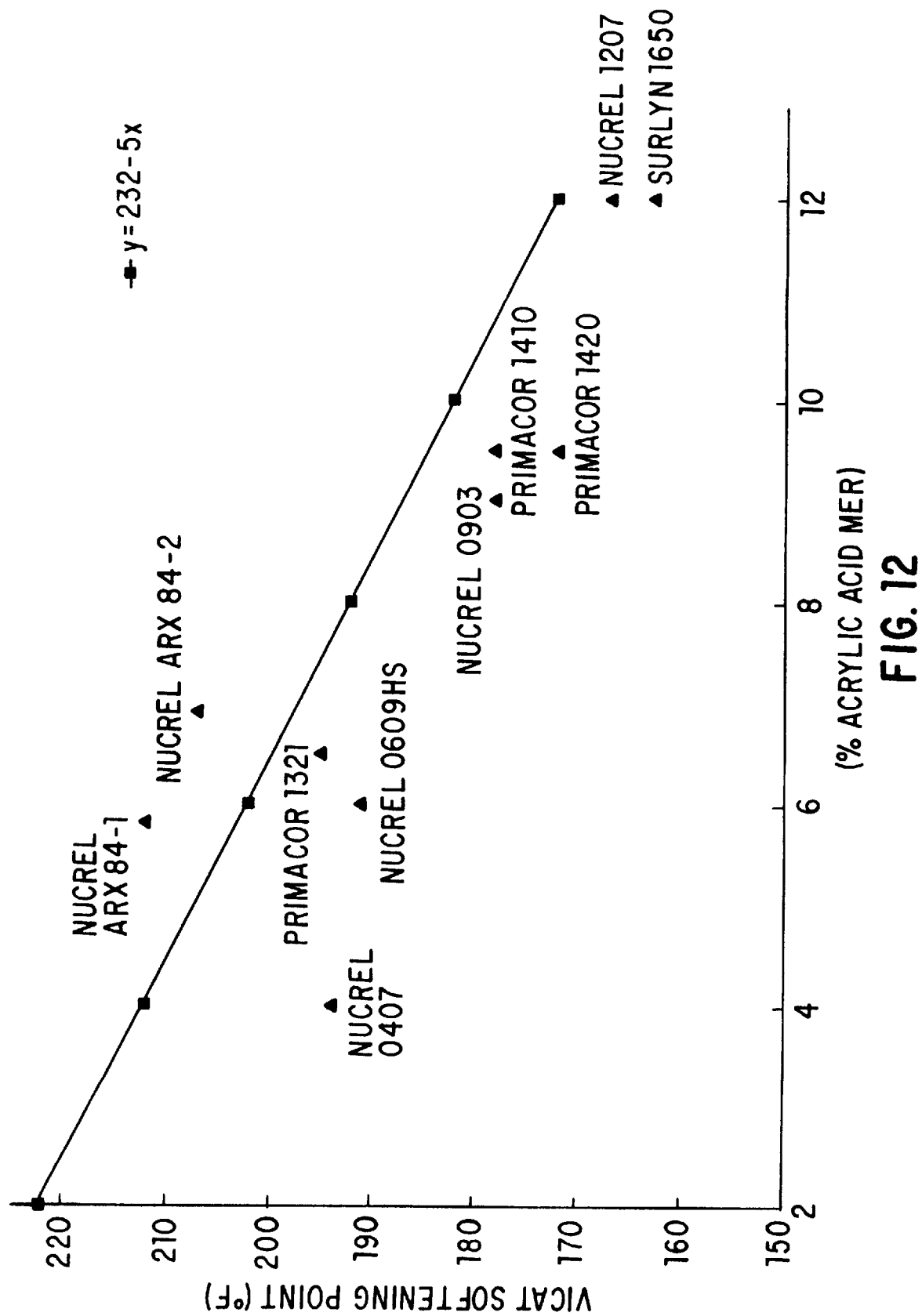
FIG. 12 provides the Vicat softening point and % acrylic acid mer content for various acrylic acid copolymers, methacrylic acid copolymers, and an ionomer resin.

For these "previously-available" ethylene/acrylic acid copolymers, this equation applies up to moderate acrylic acid concentrations, i.e., up to about 30%. Recently, a new type of ethylene/acrylic acid copolymer has become available. This ethylene/acrylic acid copolymer has a higher Vicat softening point than the previously-available ethylene/acrylic acid copolymers. FIG. 12 identifies various ethylene/acrylic acid copolymers and discloses, for each ethylene/acrylic acid copolymer, the tradename of the ethylene/acrylic acid copolymer, the % acrylic acid mer in the copolymer as well as the Vicat softening point for each copolymer. The downward sloping line represents the equation immediately above. Previously-available copolymers all fall below the line, whereas the recently-available copolymers useful in the present invention all fall above the line. Thus, the downward sloping line distinguishes the recently-available ethylene/acrylic acid copolymers (above the line) useful in the present invention from various previously-available copolymers (below the line).

As is apparent from FIG. 12, the two available copolymers having the highest Vicat softening point are NUCREL® ARX 84-2 and NUCREL® ARX 84-1, which exhibit Vicat softening points of 212° F. and 207° F., respectively. Of all of the available ethylene/acrylic acid copolymers identified in FIG. 12, only NUCREL® ARX 84-2 and NUCREL® ARX 84-1 can be used to make the packaged product according to the present invention.

As used herein, the phrase "Vicat Softening Point" refers to the temperature at which a flat-nosed needle of 1-mm² circular cross section penetrates a thermoplastic specimen to a depth of 1 mm under a specified load using a uniform rate of temperature rise, in accordance with ASTM D 1525, which is hereby incorporated in its entirety by reference thereto.

As used herein, the term "film" is used in a generic sense to include plastic web, regardless of whether it is film or sheet. Preferably, films of and used in the present invention have a thickness of 0.25 mm or less. As used herein, the term "package" refers to packaging materials configured around a product being packaged. The phrase "packaged product," as used herein, refers to the combination of a product which is surrounded by a packaging material.

As used herein, the term "seal" refers to any seal of a first region of a film surface to a second region of a film surface, wherein the seal is formed by heating the regions to at least their respective seal initiation temperatures. The sealing can be performed by any one or more of a wide variety of manners, such as using a heated bar, hot air, infrared radiation, ultrasonic sealing, etc, and even the use of clips on, for example, a shirred casing, etc.

As used herein, the phrases "food-contact layer" and "meat-contact layer" refer to a layer of a multilayer film which is in direct contact with the food/meat in the package comprising the film. In a multilayer film, a food-contact layer is always an outer film layer, as the food-contact layer is in direct contact with the food product within the package. The food-contact layer is an inside layer in the sense that with respect to the packaged food product, the food-contact layer is the inside layer (i.e., innermost layer) of the package, this inside layer being in direct contact with the food. As used herein, the phrases "food-contact surface" and "meat-contact surface" refer to an outer surface of a food contact layer, this outer surface being in direct contact with the food within the package.

As used herein the phrases "meat-adhesion," "film-to-meat adhesion," "film-to-food adhesion," and "adhered", refer to maintaining direct contact between the meat surface and the meat-contact surface of the film, so that there is an absence of a substantial amount of free moisture. i.e. purge, which is water and juices emitted outside of the food/meat product. In general, there is an absence of a substantial amount of free moisture if the level of free moisture is from about 0 to 2%, based on the weight of the meat product before cooking. Preferably the amount of free moisture is from about 0 to 1%, more preferably, 0 to 0.5%, and still preferably from 0 to 0.1 percent based on the weight of the meat product before cooking.

As used herein, the phrase "meat pull-off" refers to that portion of a cook-in meat product which is torn off of the meat product upon stripping the cook-in film from the cooked meat product.

As used herein, the term "ham," and the phrase "ham products," include the following categories known to those of skill in the art: ham with natural juices, ham with water added, and, ham-and-water product. The ham with natural juices comprises at least 17$\frac{1}{3}$% protein fat-free [PFF], while the ham with water added comprises at least 16% protein fat-free. The ham-and-water product on the other hand, comprises at least 16% protein fatfree, but also comprises added ingredients in an amount of about 35 weight percent, based on the weight of the product. Due to the relatively high percentage of added ingredients in the ham-and-water product, it is much more difficult to obtain adequate film-to-meat adhesion to the ham-and-water product than to the other above-identified ham products. The above descriptions of ham products are known to those of skill in the art, and moreover, are disclosed in the Encyclopedia of Labeling Meat and Poultry Products, Eighth Edition, Meat Plant Magazine, St. Louis, Mo.

As used herein, the phrase "cook-in" refers to the process of cooking a product packaged in a material capable of withstanding exposure to long and slow cooking conditions while containing the food product, for example submersion in water at 57° C. to 121° C. (i.e, 135° F.–250° F.) for 2–12 hours, preferably 57° C. to 100° C.(i.e, 135° F.–250° F.) for 2–12 hours. Cook-in packaged foods are essentially prepackaged, precooked foods which may be directly transferred to the consumer in this form. These types of foods may be consumed with or without warning. Cook-in packaging materials maintain seal integrity, and in the case of multilayer films are delamination resistant. Cook-in films must also be heat shrinkable under cook-in conditions so as to form a tightly fitting package. Cook-in films preferably have a tendency for adhesion to the food product, thereby preventing "cook-out", which is the collection of juices between the outer surface of the food product and the meat-contact surface of the film i.e., the surface in direct contact with the meat. Additional optional characteristics of films for use in cook-in applications include delamination-resistance, low $O_2$-permeability, heatshrinkability representing about 20–50% biaxial shrinkage at about 85° C. (185° F.), and optical clarity. For hermetically sealed bags, it is preferred that the external surface of the package is subjected to a temperature of at least about 150° F., preferably from about 150° F. to 212° F.; more preferably, from about 160° to 212° F., still more preferably, from about 165° F. to 200° F., and, even yet still more preferably, from about 170° F. to 180° F.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably from about 50 to 100 mole percent, more preferably, from about 85 to 100 mole percent.

As used herein, the term "barrier", and the phrase "barrier layer", as applied to films and/or film layers, are used with reference to the ability of a film or film layer to serve as a barrier to one or more gases. In the packaging art, oxygen (i.e., gaseous $O_2$) barrier layers have included, for example, hydrolyzed ethylene/vinyl acetate copolymer (designated by the abbreviations "EVOH" and "HEVA", and also referred to as "ethylene/vinyl alcohol copolymer"), polyvinylidene chloride, polyamide, polyester, polyacrylonitrile, etc., as known to those of skill in the art.

As used herein, the phrase "abuse layer", as well as the phrase "puncture-resistant layer", refer to an outer film layer and/or an inner film layer, so long as the film layer serves to resist abrasion, puncture, and other potential causes of reduction of package integrity, as well as potential causes of reduction of package appearance quality.

As used herein, the terms "lamination," "laminate," as well as the phrase "laminated film," refer to the process, and resulting product, made by bonding together two or more layers of film or other materials. Lamination can be accomplished by joining layers with adhesives, joining with heat and pressure, with corona treatment, and even spread coating and extrusion coating. The term laminate is also inclusive of coextruded multilayer films comprising one or more tie layers.

As used herein, the term "oriented" refers to a polymer-containing material which has been elongated (generally at an elevated temperature called the orientation temperature), followed by being "set" in the elongated configuration by cooling the material while substantially retaining the elongated dimensions. This combination of elongation at elevated temperature followed by cooling causes an alignment of the polymer chains to a more parallel configuration, thereby improving the mechanical properties of the film. Upon subsequently heating unrestrained, unannealed, oriented polymer-containing material to its orientation temperature, heat shrinkage is produced almost to the original dimensions, i.e. pre-elongation dimensions. The term "oriented," is herein used with reference to oriented films, which can undergo orientation in any one or more of a variety of manners.

Orienting in one direction is referred to herein as "uniaxial orientation," while orienting in two directions is referred to herein as "biaxial orientation." In oriented plastic films, there can be internal stress remaining in the plastic sheet which can be relieved by reheating the film to a temperature above that at which it was oriented. Upon reheating such a film, the film tends to shrink back to the original dimensions it had before it was oriented. Films which shrink upon being heated are generally referred to as heatshrinkable films.

As used herein, the phrase "orientation ratio" refers to the multiplication product of the extent to which the plastic film material is oriented in several directions, usually two directions perpendicular to one another. Orientation in the machine direction is herein referred to as "drawing", whereas orientation in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, also known as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, tetrapolymers, etc. In general, the layers of a film can consist essentially of a single polymer, or can have additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. The term "copolymer" is also inclusive of, for example, the copolymerization of a mixture of ethylene, propylene, 1-hexene, and 1-octene. As used herein, the term "copolymerization" refers to the simultaneous polymerization of two or more monomers. The term "copolymers" is also inclusive of random copolymers, block copolymers, and graft copolymers.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

As used herein, a copolymer identified in terms of a plurality of monomers, e.g. "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/ alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, copolymers are identified, i.e. named, in terms of the monomers from which the copolymers are produced. For example, the phrase "propylene/ethylene copolymer" refers to a copolymer produced by the copolymerization of both propylene and ethylene, with or without additional comonomer(s). As used herein, the phrase "mer" refers to a unit of a polymer, as derived from a monomer used in the polymerization reaction. For example, the phrase "alpha-olefin mer" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers can be used in various layers of multilayer films useful in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," may be determined by gel permeation chromatography. Homogeneous ethylene/alpha-olefin copolymers which can be used in the present invention preferably have an $M_w/M_n$ of less than 2.7; more preferably from about 1.9 to 2.5; still more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes homogeneous copolymers (i.e., narrow composition distribution as assessed by CDBI values generally above 70%) from VLDPEs available commercially which generally have a broad composition distribution as assessed by CDBI values generally less than 55%. TREF data and calculations therefrom for determination of CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20. p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers useful in the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 105° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from tie group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, to HODGSON, Jr., U.S. Pat. No. 5,241,031, to MEHTA, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents. Inc. as the Applicant, and both of which are hereby incorporated by reference thereto, in their respective entireties.

Still another species of homogeneous ethylene/alpha-olefin copolymers is disclosed in U.S. Pat. No. 5,272,236, to LAI, et. al., and U.S. Pat. No. 5,278,272, to LAI. et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer. ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" refers to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrases "ethylene alpha-olefin copolymer", and "ethylene/alpha-olefin copolymer", refer to such heterogeneous materials as low density polyethylene (LDPE), medium density polyethylene (MDPE), linear low density polyethylene (LLDPE), and very low and ultra low density polyethylene (VLDPE and ULDPE), as well as to such homogeneous ethylene/alpha olefin copolymers as: metallocene-catalyzed EXACT (TM) linear homogeneous ethylene/alpha olefin copolymer resins obtainable from the Exxon Chemical Company, of Baytown, Texas, homogeneous substantially linear ethylene/alpha-olefin copolymers having long chain branching (e.g., copolymers known as AFFINITY (TM) resins, and ENGAGE (TM) resins, available from the Dow Chemical Company of Midland. Michigan), as well as TAFMER (TM) linear homogeneous ethylene/alpha-olefin copolymer resins obtainable from the Mitsui Petrochemical Corporation. Both the heterogeneous polymers and homogeneous polymers referred to above generally include copolymers of ethylene with one or more comonomers selected from $C_4$ to $C_{10}$ alpha-olefin such as butene-1 (i.e., 1-butene), hexene-1, octene-1, etc. While LDPE and MDPE are more highly branched than LLDPE, VLDPE, ULDPE, EXACT (TM) resin, and TAFMER (TM) resin, this latter group of resins has a relatively large number of short branches rather than the longer branches present in LDPE and MDPE. AFFINITY (TM) resins and ENGAGE (TM) resins have a relatively large number of short branches in combination with a relatively small number of long-chain branches. LLDPE has a density usually in the range of from about 0.91 grams per cubic centimeter to about 0.94 grams per cubic centimeter.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

Film useful in the present invention may be monolayer film or multilayer film. If multilayer, preferably the film has a total of from 1 to 20 layers, more preferably, from 2 to 12 layers. The multilayer film can have any total number of layers and any total thickness desired, so long as the film provides the desired properties for the particular packaging operation in which the film is used, e.g. $O_2$-barrier characteristics, free shrink, shrink tension, optics, modulus, seal strength, etc.

As used herein, the phrases "inner layer" and "internal layer" refer to any layer, of a multilayer film, having both of its principal surfaces directly adhered to another layer of the film.

As used herein, the phrase "inside layer" refers to an outer film layer, of a multilayer film packaging a product, which is closest to the product, relative to the other layers of die multilayer film. "Inside layer" also is used with reference to the innermost layer of a plurality of concentrically arranged layers simultaneously coextruded through an annular die.

As used herein, the phrase "outer layer" refers to any film layer of film having less than two of its principal surfaces directly adhered to another layer of the film. The phrase is inclusive of monolayer and multilayer films. All multilayer films have two, and only two, outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers simultaneously coextruded through an annular die.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e. one or more additional layers can be imposed between the subject layer and one or more of the layers the subject layer is between.

As used herein, the term "core", and the phrase "core layer", as applied to multilayer films, refer to any inner film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrases "seal layer," "sealing layer," "heat seal layer," and "sealant layer," refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods. In general, sealant layers employed in the packaging art have included thermoplastic polymers, such as polyolefin, polyamide, polyester, and polyvinyl chloride.

As used herein, the phrase "tie layer" refers to any inner film layer having the primary purpose of adhering two layers to one another. Tie layers can comprise any polymer having a polar group thereon, or any other polymer which provides sufficient interlayer adhesion to adjacent layers comprising otherwise nonadhering polymers.

As used herein, the phrase "skin layer" refers to an outside layer of a multilayer film in packaging a product, this skin layer being subject to abuse.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

The names "first layer", "second layer", as used herein, are generally indicative of the manner in which a multilayer film structure is built up. That is, in general, the first layer can be present without any of the additional layers described, or the first and second layers can be present without any of the additional layers described, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when shrunk at 185° F., with the quantitative determination being carried out according to ASTM D 2732, as set forth in the 1990 Annual Book of ASTM Standards, Vol. 08.02, pp. 368–371, which is hereby incorporated, in its entirety, by reference thereto.

Although the majority of the above definitions are substantially as understood by those of skill in the art, one or more of the above definitions may be defined hereinabove in a manner differing from the meaning as ordinarily understood by those of skill in the art, due to the particular description herein of the present invention.

In general, the film used in the present invention can be a monolayer film or a multilayer film. The multilayer film illustrated in FIG. 1 comprises two layers; in FIG. 2, six layers; in FIG. 3, eight layers; in FIG. 5, seven layers; and in FIG. 6, nine layers. Preferably, the film used in the present invention comprises from 2 to 20 layers, more preferably, from 2 to 12 layers; and still more preferably, from 4 to 9 layers.

In general, the multilayer film used in the present invention can have any total thickness desired, so long as the film provides the desired properties for the particular packaging operation in which the film is used. Preferably, the film used in the present invention has a total thickness (i.e., a combined thickness of all layers), of from about 0.3 to 15 mils (1 mil equals 0.001 inch); more preferably, from about 1 to 10 mils; and still more preferably, from 1.5 to 8 mils. For shrinkable casings, the range from 1.5–3 mils is even more preferred while for laminates used in cook-in packaging, the range from 4–8 mils is even more preferred.

Figure 1:
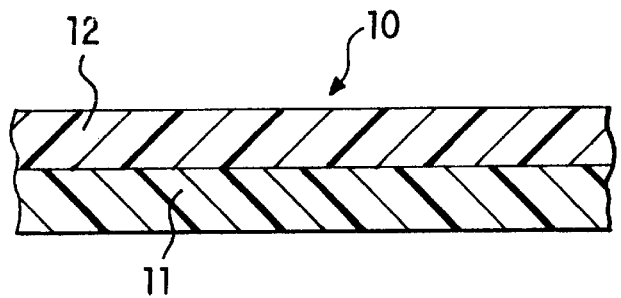
FIG. 1 illustrates an enlarged cross-sectional view of a two-layer multilayer film for use in the packaged product of the present invention.

In FIG. 1, multilayer film 10 comprises first layer 11 and second layer 12. First layer 11 serves as a meat-contact layer. Second layer 12 serves as an abuse layer.

Figure 2:
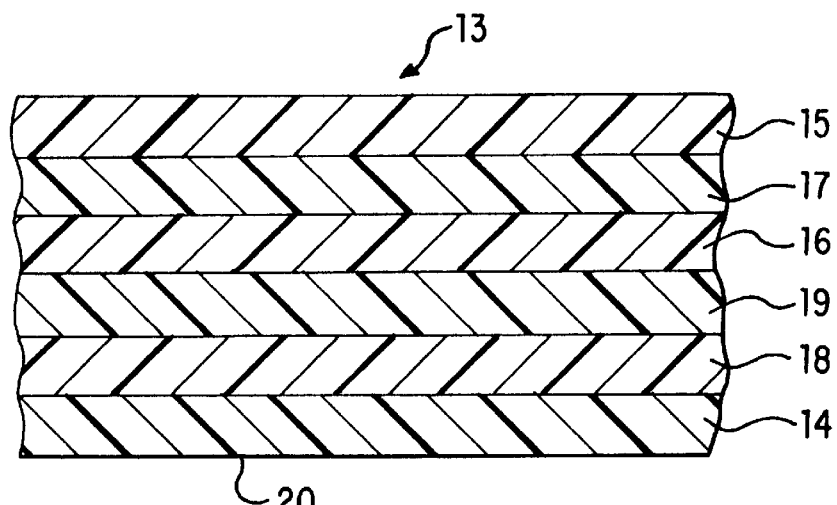
FIG. 2 illustrates an enlarged cross-sectional view of a six-layer multilayer film for use in the packaged product of the present invention.
Figure 3:
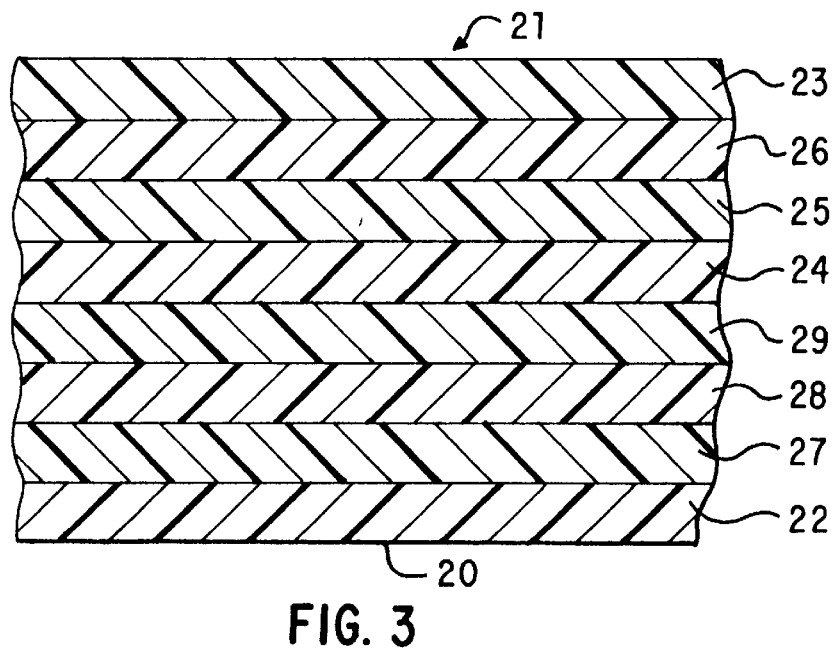
FIG. 3 illustrates an enlarged cross-sectional view of a eight-layer multilayer film for use in the packaged product of the present invention.

FIGS. 2 and 3 illustrate two alternative preferred embodiments of oriented heat-shrinkable multilayer films to be used in the packaged product of the present invention. FIG. 2 illustrates a six-layer film, and FIG. 3 illustrates an eight-layer film. These two films are especially suited for conversion to heat-shrinkable bags and casings for the packaging of meat products, in accordance with the present invention.

FIG. 2 illustrates a preferred embodiment of a heat-shrinkable multilayer film 13 to be used in packaging meat in bags, casings, and films, in accordance with the present invention. First layer 14 serves as an inside layer and has outer meat-contact surface 20 for direct contact with the meat being packaged. First layer 14 comprises an olefin/acrylic acid copolymer having a Vicat softening point, in ° F., of at least: [1232–5.0 (percent acrylic acid mer content)]. The acrylic acid can be acrylic acid or a homologue, e.g., methacrylic acid. The olefin is preferably ethylene. More preferably, the olefin/acrylic acid copolymer has a Vicat softening point, in ° F., of at least [232–4.6 (percent acrylic acid mer content)]; still more preferably, at least [232–4.3 (percent acrylic acid mer content)] ° F.; yet still more preferably, at least [232–4.0 (percent acrylic acid mer content)] ° F.; and even yet still more preferably, at least [232–3.7 (percent acrylic acid mer content)]. Preferably, the Vicat softening point of the olefin/acrylic acid copolymer is from about 160° F. to about 300° F.; more preferably, from about 170° F. to about 250° F.; still more preferably, from about 190° F. to about 230° F.; and, yet still more preferably, from about 200° F. to about 220°F.

For packaged products wherein the film is being converted into a heat-sealed bag, it is preferred that the olefin/acrylic acid copolymer of first layer 14 has a Vicat softening point of at least 175° F. (preferably 175°–300° F.), more preferably at least 185° F. (preferably 185°–300° F.), still more preferably at least 195° F. (preferably 195°–300° F.) and even more preferably at least 205° F. (preferably 205°–300° F.). With regard to the acrylic acid content, the olefin/acrylic acid copolymer of first layer 14 preferably comprises acrylic acid mer in an amount of at least 1 weight percent (preferably, from about 1 to 30); more preferably, at least 3 weight percent (preferably, from about 3 to 20); still more preferably, at least 5 weight percent (preferably, from about 5 to 15); yet still more preferably at least 7 weight percent (preferably, from about 7 to 13); and even yet still more preferably, at least 9 weight percent (preferably, from about 9 to 10). In some preferred situations, the acrylic acid mer content may be as high as 10%, perhaps 15%, in some cases even 30%. In one preferred embodiment. the olefin/acrylic acid copolymer of first layer 14 preferably comprises a block copolymer of ethylene and acrylic acid. In other preferred embodiments, the olefin/acrylic acid copolymer of first layer 14 is neutralized to yield an ionomer or terpolymerized with other comonomers, which may, together with the acrylic acid mer present in the terpolymer, assist in lowering or raising the Vicat softening point of the terpolymer.

The olefin/acrylic acid copolymer of first layer 14 preferably has a melting point (in ° F.) greater than [248° F.–5 (percent acrylic acid mer content)]. Preferably, the melting point is greater than [248° F.—4.7 (percent acrylic acid mer content)]° C., more preferably, greater than [248° F.–4.3

[percent acrylic acid mer content)]°C.; still more preferably greater than [248° F.–4 (% acrylic acid %)]° C.; and yet still more preferably, greater than [248° F.–3.6 (% acrylic acid)]° C. Preferably, the melting point should be at least 200° F. more preferably from about 210° to 300° F., still more preferably from about 220° to 260° F. and yet still more preferably from about 230° to 250° F.

First layer 14 can further comprise additional polymers. Preferred polymers include at least one member selected from the group consisting of polyolefin, polystyrene, polyamide, polyester, polymerized ethylene vinyl alcohol, polyvinylidene chloride, polyether, polyurethane, polycarbonate, and starch-containing polymer; more preferably, at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer.

The olefin/acrylic acid copolymer of first layer 14 preferably has a melt index of from about 0.3–50, more preferably from about 0.5 to 10 and still more preferably from about 1–5.

Preferably, the olefin/acrylic acid copolymer has less than 30% of the polymer melted at 194° F., more preferably less than 25% of the polymer melted at 194° F. still more preferably less than 20% of the polymer melted at 194° F. and even more preferably less than 15% of the polymer melted at 194° F.

Preferably, the olefin/acrylic acid copolymer of first layer 14 comprises anti-oxidant. Preferably, the antioxidant is present in an amount of from about 100 to 1500 ppm; more preferably, from about 200 to 1000 ppm. The antioxidants are especially preferred when the olefin/acrylic acid copolymer is subjected to irradiation. The incorporation of antioxidant is especially preferred because it is believed that the olefin/acrylic acid copolymer of first layer 14 is more susceptible to cross-linking than previously available olefin/acrylic acid copolymers such as SURLYN® 1650 ionomer resin and cross-linking of the seal layer makes it relatively difficult to apply a hermetic heat-seal.

The above description of first layer 14 applies not only to the multilayer film of FIG. 2, but also to all films useful in the packaged product according to the present invention.

Preferably, first layer 14 has a thickness of from about 0.1 to 4 mils; more preferably, from about 0.2 to about 1 mil; and, still more preferably, from about 0.3 to 0.8 mils. In embodiments in which the packaged product comprises a bag in which a meat product is packaged and thereafter cooked, first layer 14 preferably comprises at least 10% of a total weight of the multilayer film; more preferably, from about 12% to 25% by weight of the total multilayer film. In the case of oriented films used to make bags, it is preferred that the olefin/acrylic acid copolymer of first layer 14 is less than 35% by weight of the multilayer film; more preferably from about 5 to 25% by weight of the multilayer film; still more preferably, from about 10 to 20% by weight of the multilayer film, as thicker layers could cause problems during the orientation process.

Second layer 15 serves as an outside heat-resistant and abuse layer, and preferably has a thickness of from about 0.1 to 5 mils; more preferably, from 0.2 to 3 mil; still more preferably, from 0.3 to 2 mil; and yet still more preferably, about 0.5 to 1.5 mil. Preferably, second layer 15 comprises at least one member selected from the group consisting of polyolefin, polystyrene, polyamide, polyester, polymerized ethylene vinyl alcohol, polyvinylidene chloride, polyether, polyurethane, polycarbonate, and starch-containing polymer; more preferably, at least one member selected from the group consisting of polyolefin; still more preferably, at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer; and still more preferably, a blend of 80 weight percent ethylene vinyl acetate copolymer (having 6.5 weight percent vinyl acetate) with 20 weight percent high density polyethylene.

Third layer 16 is a core layer which is between first layer 14 and second layer 15, and which preferably comprises a polymer having relatively high $O_2$-barrier characteristics. Preferably, third layer 16 has a thickness of from about 0.05 to 2 mils; more preferably, from 0.05 to 0.5 mil; yet still more preferably, from 0.1 to 0.3 mil; and even yet still more preferably, from about 0.12 to 0.17 mils. Preferably, third layer 16 comprises at least one member selected from the group consisting of polymerized ethylene vinyl alcohol (EVOH), polyvinylidene chloride, polyamide, polyester and polyalkylene carbonate; more preferably, at least one member selected from the group consisting of EVOH and polyamide; still more preferably, EVOH; yet still more preferably, EVOH having about 44 mole percent ethylene mer.

Fourth layer 17 is a tie layer between second layer 15 and third layer 16. As a general rule, tie layers should have a relatively high degree of compatibility with barrier layers, such as polymerized EVOH, as well as non-barrier layers, such as polymerized ethylene/alpha-olefin copolymers, and, in general, the composition, number, and thickness of the tie layer(s) is as known to those of skill in the art. Preferably, fourth layer 17 has a thickness of from about 0.01 to 2 mils; more preferably, from 0.05 to 0.3 mil; and, still more preferably, from about 0.1 to 0.25 mils. Preferably, fourth layer 17 comprises at least one member selected from the group consisting of modified polyolefin, ionomer, ethylene/unsaturated acid copolymer, ethylene/unsaturated ester copolymer, polyamide, and polyurethane; more preferably, at least one member selected from the group consisting of modified polyolefin and polyurethane; still more preferably, at least one member selected from the group consisting of modified ethylene/alpha-olefin copolymer, modified ethylene/unsaturated ester copolymer, and modified ethylene/unsaturated acid copolymer, even yet still more preferably, anhydride grafted linear low density polyethylene.

Fifth layer 18, a core layer between the first layer and the third layer, provides the multilayer film with desired abuse, shrink, and optical characteristics, and preferably comprises a polymer having relatively low cost while providing these attributes. Preferably, fifth layer 18 has a thickness of from about 0.1 to 3 mils; more preferably, from 0.2 to 1.5 mil; still more preferably, from 0.3 to 1 mil; and yet still more preferably, from about 0.50 to 0.80 mils. Preferably, fifth layer 17 comprises at least one member selected from the group consisting of polyolefin, polystyrene, polyamide, polyester, polymerized ethylene vinyl alcohol, polyvinylidene chloride, polyether, polyurethane, polycarbonate, and starch-containing polymer, more preferably, at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer; still more preferably, ethylene/unsaturated ester copolymer.

Sixth layer 19 is a tie layer between the third layer and the fifth layer. Sixth layer 19 has the same preferred thicknesses and chemical compositions as fourth layer 17.

FIG. 3 illustrates an alternative preferred embodiment of a heat-shrinkable multilayer film 21 to be used in packaging meat in bags, casings, and films, in accordance with the present invention. Multilayer film 21 comprises first layer 22, second layer 23, third layer 24, fourth layer 25, fifth layer 26, sixth layer 27, seventh layer 28, and eighth layer 29.

First layer 22 is a meat-contact and heat seal layer which preferably is analogous to first layer 14 of FIG. 2, and serves as an inside layer and has outer meat-contact surface 20 for direct contact with the meat being packaged. Preferably, first layer 22 has a thickness and chemical composition analogous to first layer 14 of FIG. 2.

Second layer 23 is an outer abuse-resistant layer which preferably is analogous to second layer 14 of FIG. 2. Preferably, second layer 23 has a thickness and chemical composition analogous to second layer 14 of FIG. 2.

Third layer 24 is a core layer between first layer 22 and second layer 23, and preferably is analogous to third layer 16 of FIG. 2. Preferably, third layer 24 has a thickness and chemical composition analogous to third layer 16 of FIG. 2.

Fourth layer 25 is a tie layer between second layer 23 and third layer 24, and preferably is analogous to fourth layer 17 of FIG. 2. Preferably, fourth layer 25 has a thickness and chemical composition analogous to fourth layer 17 of FIG. 2.

Fifth layer 26 is a core layer between second layer 23 and fourth layer 25, and provides abuse-resistance, improved heat shrink properties, and improved optical properties to multilayer film 21. Preferably, fifth layer 26 has a thickness and chemical composition analogous to fifth layer 18 of FIG. 2.

Sixth layer 27 is a core layer between first layer 22 and third layer 24, and provides abuse-resistance, improved heat shrink properties, and improved optical properties to multilayer film 21. Preferably, sixth layer 27 has a thickness and chemical composition analogous to fifth layer 26.

Seventh layer 28 is a tie layer between sixth layer 27 and third layer 24, and preferably is analogous to fourth layer 25. Preferably, seventh layer 28 has a thickness and chemical composition analogous to fourth layer 25.

Eighth layer 29 is a core layer between seventh layer 28 and third layer 24, and provides improved abuse-resistance and elastic recovery to multilayer film 21, and preferably comprises a polymer having relatively high modulus and/or relatively high elastic recovery, such as a polyamide, a polyester and/or a thermoplastic elastomer. Preferably, eighth layer 29 has a thickness of from about 0.05 to 1mil; more preferably, from 0.1 to 0.5 mil still more preferably, from about 0.2 to 0.4 mil., and yet still more preferably, about 0.3 mils. Preferably, eighth layer 29 comprises a polyamide; more preferably, at least one member selected from the group consisting of polyamide 6, polyamide 11, polyamide 12, polyamide 66, polyamide 69, polyamide 610, and polyamide 612, polyamide 6I, polyamide 6T, MXD6 and copolymers thereof; still more preferably, a blend of 50 weight percent polyamide 6 and 50 weight percent copolyamide 6/12.

The films according to the present invention are suited to many different forms of packaging applications, such as shirred casings, heat shrinkable bags, films (both heat-shrinkable as well as non-heat-shrinkable), and web and lid stock suitable for themoforming. However, the films illustrated in FIG. 2 and FIG. 3 are especially suited for use in heat-shrinkable bags and casings. In one preferred embodiment multilayer film 13 and multilayer film 21 preferably have a machine direction free shrink of at least 10 percent at a temperature of 185° F. (ASTM D 2732), and a transverse direction free shrink of at least about 10 percent at a temperature of 185° F. More preferably, the multilayer film 13 and multilayer film 21 have a free shrink in at least one direction, of at least 20%, even more preferably at least 30% still more preferably at least 40%, and yet still more preferably, at least 50%, at a temperature of 185° F. In another preferred embodiment, multilayer film 13 and multilayer film 21 are oriented but have been heat-set/annealed, thereby yielding a transverse direction free shrink of less than 10% at 185° F.; more preferably a transverse direction free shrink of less than 5% at a 185° F.

In one preferred embodiment, multilayer film 13 and multilayer film 21 are corona-treated on the meat-contact surface of the inside layer, and, optionally, are corona-treated on the outside surface of the outside layer. Corona treatment of the inside layer can result in decreased purge. Corona treatment on the outside surface can improve bonding during heat-sealing of the outside layer to another layer, such as the meat-contact surface of the inside layer, in a lap joint/seal.

Figure 4:
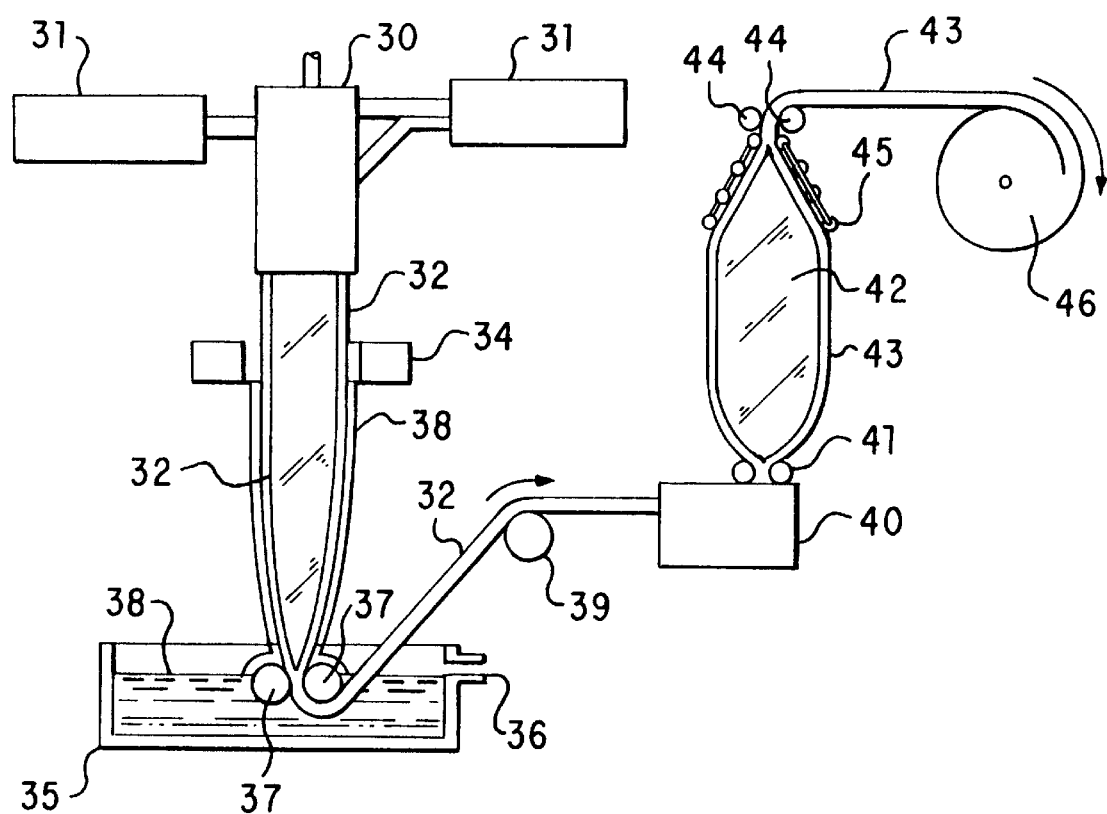
FIG. 4 illustrates a schematic view of a preferred process for making preferred multilayer films for use in the packaged product of the present invention, for example, for the multilayer films illustrated in FIGS. 2 and 3.

The multilayer films illustrated in FIGS. 2 and 3 are preferably prepared in accordance with a process as schematically illustrated in FIG. 4, in which the various polymeric formulations are supplied to circular die 30 from a plurality of extruders 31, only two of which are illustrated in FIG. 4. The number of extruders 31 is at least as great as the number of different chemical compositions present in the various layers of the multilayer film, but can be fewer than the number of layers of the film in the event that a stream from an extruder is split to form two different film layers. The various layers of the film are joined within circular die 30, resulting in the formation of tube 32, which is a substantially unoriented tape comprising all of the layers ultimately present in the film used in accordance with the present invention. The meat-contact layer, i.e., the first layer, is the inside layer of tube 32, and the abuse layer, i.e., the second layer, is the outside layer of tube 32. The barrier layer, the various core layers, and the various tie layers, are positioned between the first and second layers, in the order illustrated in cross-sectional diagrams provided in FIGS. 2 and 3.

Circular die 30 is heated in conventional fashion by means not shown. As tube 32 emerges from the face of die 30, corn starch (not illustrated) is sprayed inside tube 32, in order to prevent blocking of tube 32, as known to those of skill in the art. As tube 32 leaves the face of die 30, tube 32 is drawn in a downward direction, past water-cooling ring 34, having water 38 flowing downwardly therefrom, over the exterior surface of tube 32, and cascading downward into tank 35. Overflow 36 maintains the level of water 38 in tank 35. Tube 32 is drawn downwardly and between driven pinch rolls 37.

After passing over guide roll 39, tube 32 is passed through a scan beam of an electronic crosslinking unit (not illustrated), as known to those of skill in the art. Tube 32, emerging from the electronic crosslinking unit, is then fed to hot oven 40. At the outlet of oven 40 are pinch rolls 41 which forward the tube 32, now heated. immediately into an orientation zone, in which the emerging heated tube is simultaneously stretched and drawn. resulting in the formation of a bubble of oriented multilayer film 43, as used in the present invention. The hot tube, upon emerging from oven 40, is stretched in the transverse direction via inflation with air 42 (introduced into the tube to form a bubble between pinch rolls 41 and pinch rolls 44), and drawn in die machine direction by pinch rolls 44, which forward the resulting oriented multilayer film 43 at a higher speed than the speed at which tube 32 is forwarded by pinch rolls 41. Multilayer film 43 is cooled by external air while in the bubble configuration. The bubble of oriented multilayer film 43 is gradually flattened with the aid of converging rolls 45. Following the collapse of the bubble of multilayer film 43 by converging rolls 45, the resulting flattened multilayer film is fed to windup roll 46, which is rotated by a motor (not illustrated).

The resulting multilayer film can be used to form bags, casings, etc., which, in turn, can be used for the packaging of meat products, in accordance with the present invention. Examples 1, 2 and 3, below, provide additional details on some of the preferred films, their use in the packaging of a meat product, and the unexpected results obtained therefrom.

Figure 5:
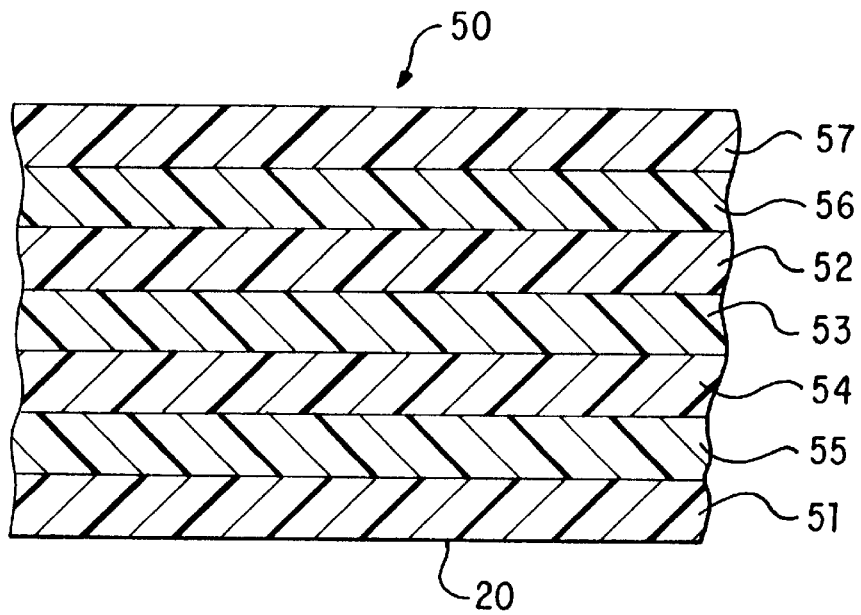
FIG. 5 illustrates an enlarged cross-sectional view of a seven-layer multilayer film for use in the packaged product of the present invention.
Figure 6:
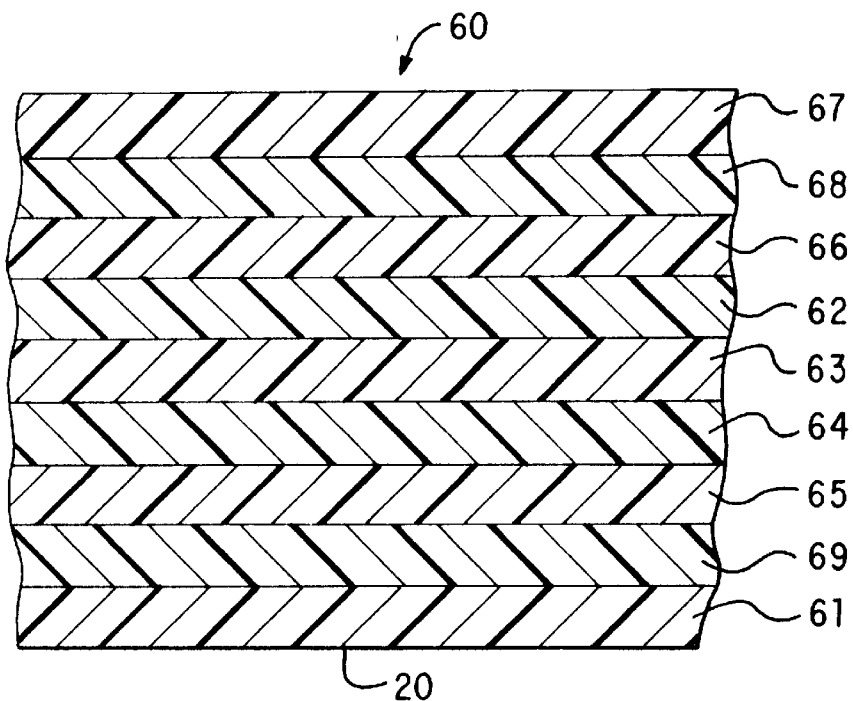
FIG. 6 illustrates an enlarged cross-sectional view of a nine-layer multilayer film for use in the packaged product of the present invention.

FIGS. 5 and 6 illustrate two preferred embodiments of multilayer laminate films to be used in accordance with the present invention, FIG. 5 illustrating a seven-layer film, and FIG. 6 illustrating a nine-layer film. These two films are especially suited for use in thermoforming operations, both as the forming web, i.e., a web to be thermoformed, as well as for use as the lidstock. Preferably, the lidstock is a multilayer film comprising the same number of layers and relative layer percentages (thicknesses), differing only in that it has a total thickness of about 50% the total thickness of a corresponding forming web.

Seven-layer film 50 illustrated in FIG. 5 comprises first layer 51, which serves as an inside layer and has outer meat-contact surface 20 for direct contact with the meat (not illustrated) being packaged. In general, first layer 51 is analogous to first layer 14 illustrated in FIG. 2 and has a chemical composition analogous to first layer 14 of FIG. 2. Preferably, first layer 51 has a thickness of from about 0.02 to 3 mils. If first layer 51 constitutes the entire sealing layer, preferably it has a thickness of from about 1.2 to 2.6 mils; more preferably, about 2.3 mils. If first layer 51 functions as a mere coating on a sealing layer therebelow, preferably first layer 51 has a thickness of from about 0.1 to 0.8 mil; more preferably, about 0.3 mil.

Second layer 52 is a core layer which provides improved abuse-resistance, improved thermoformability, and heat-resistance. Preferably, second layer 52 has a thickness of from about 0.2 to 10 mils; more preferably, from 0.3 to 8 mils; and, still more preferably, about 0.6 mil. Preferably, second layer 52 comprises at least one member selected from the group consisting of polyolefin, polystyrene, polyamide, polyester, polymerized ethylene vinyl alcohol polyvinylidene chloride, polyether, polyurethane, polycarbonate, and starch-containing polymer; more preferably, at least one member selected from the group consisting of polyamide, polyester, and polyolefin; still more preferably, polyamide; and, yet still more preferably, polyamide 6.

Third layer 53 is a core layer between first layer 51 and second layer 52, which optionally can serve as an O$_2$-barrier layer. In general, third layer 53 can have a thickness of from about 0.1 to 5 mils; preferably, from 0.3 to 1.5 mils; more preferably, about 0.8 mil. Preferably, third layer 53 comprises at least one member selected from the group consisting of polyolefin, polystyrene, polyamide, polyester, EVOH, polyvinylidene chloride, polyether, polyurethane polycarbonate, and starch-containing polymer, more preferably, at least one member selected from the group consisting of EVOH, polyvinylidene chloride, grafted polyolefin, ethylene/alpha-olefin copolymer, and grafted ethylene/vinyl acetate copolymer; still more preferably, at least one member selected from the group consisting of EVOH and ethylene/alpha-olefin copolymer; and, yet still more preferably, EVOH.

Fourth layer 54 is a core layer between first layer 51 and third layer 53, and provides multilayer film 50 with desired abuse and thermoforming characteristics. Preferably, fourth layer 54 has a thickness of from about 0.1 to 8 mils; more preferably, from 0.2 to 4 mils; still more preferably, from 0.4 to 0.7 mil; and, yet still more preferably, about 0.6 mils. Preferably, fourth layer 54 comprises at least one member selected from the group consisting of polyolefin, polystyrene, polyamide, polyester, EVOH, polyvinylidene chloride, polyether, polyurethane, polycarbonate, and starch-containing polymer; more preferably, at least one member selected from the group consisting of polyamide, polyester, and polyolefin; more preferably, polyamide 6.

Fifth layer 55 is a tie layer between first layer 51 and fourth layer 54. Preferably, fifth layer 55 has a thickness of from about 0.05 to 9 mils; more preferably, from 0.2 to 2 mils; and, still more preferably, about 0.65 mil. Preferably, fifth layer 55 comprises at least one member selected from the group consisting of modified polyolefin, modified polystyrene, modified polyamide, modified polyester, modified polymerized ethylene vinyl alcohol, modified polyvinylidene chloride, modified polyether, modified polyurethane, modified polycarbonate, and modified starch-containing polymer; more preferably, at least one member selected from the group consisting of modified polyolefin, and elastomer modified polyolefin; still more preferably, at least one member selected from the group consisting of anhydride-grafted polyolefin, elastomer modified polyolefin; yet still more preferably, at least one member selected from the group consisting of elastomer modified polyolefin and anhydride-grafted linear low density polyethylene.

Sixth layer 56 and seventh layer 57 are generally used as a pair of layers, rather than individually. Sixth layer 56 is a tie and bulk layer between second layer 52 and seventh layer 57. The chemical composition of sixth layer 56 is preferably similar to the chemical composition of fifth layer 55, described above. However, sixth layer 56 most preferably has a thickness of about 1.85 mils.

Seventh layer 57 is an abuse, thermoforming, and heat-resistant outer layer bonded directly to sixth layer 56. Preferably, the chemical composition and thickness of seventh layer 57 is analogous to that of second layer 52. described above. However, most preferably seventh layer 57 has a thickness of about 1.2 mils.

FIG. 6 illustrates an alternative preferred embodiment of a multilayer film 60 especially suited to thermoforming operations, for use in the packaged product in accordance with the present invention. In multilayer film 60, preferably first layer 61, second layer 62, fourth layer 64, fifth layer 65, sixth layer 66, and seventh layer 67, of multilayer film 60, are analogous to the corresponding layers of multilayer film 50 of FIG. 5, i.e., with respect to relative placement, thickness, and chemical composition.

However, even though multilayer film 60 has third layer 63 in the same relative position as third layer 53 of FIG. 5, i.e., positioned between first layer 61 and second layer 62, preferably the chemical composition and thickness of third layer 63 is different from third layer 53 of FIG. 5. i.e., preferably third layer 63 does not comprise EVOH. Preferably, third layer 63 comprises at least one member selected from the group consisting of modified polyolefin, modified polystyrene, modified polyamide, modified polyester, modified polymerized ethylene vinyl alcohol, modified polyvinylidene chloride, modified polyether, modified polyurethane, modified polycarbonate, and modified starch-containing polymer; more preferably, at least one member selected from the group consisting of polyolefin, elastomer modified polyolefin; still more preferably, at least one member selected from the group consisting of anhydride-grafted polyolefin, elastomer modified polyolefin; yet still more preferably, at least one member selected from the group consisting of elastomer modified polyolefin and anhydride-grafted linear low density polyethylene. Preferably, third layer 63 has a thickness of from about 0.05 to 9 mils, preferably, from 0.2 to 2 mils; more preferably, about 0.9 mil.

Eighth layer 68 is a core layer between sixth layer 66 and seventh layer 67, and provides multilayer film 60 with increased abuse-resistance and increased thermoformability. Preferably, eighth layer 68 has a thickness of from about 0.2 to 10 mils; preferably, from 0.3 to 8 mils; more preferably, from about 0.3 to 1.2 mils, and, still more preferably, about 0.6 mil. Preferably, eighth layer 68 comprises at least one member selected from the group consisting of polyolefin, polystyrene, polyamide, polyester, polymerized ethylene vinyl alcohol, polyvinylidene chloride, polyether, polyurethane, polycarbonate, and starch-containing polymer; more preferably, at least one member selected from the group consisting of polyamide, polyester, and polyolefin; still more preferably, polyamide; yet still more preferably, a blend of 75 weight percent polyamide 6 with 25 weight percent amorphous nylon.

Ninth layer 69 is a core layer between first layer 61 and fifth layer 65, and provides the multilayer film with increased abuse-resistance and bulk, and, since outer first layer 61 is preferably thin, also functions, with first layer 61, as a seal-assist layer. Preferably, ninth layer 69 can have a thickness of from about 0.1 to 5 mils; preferably, 0.5 to 4 mils; more preferably, 1 to 3 mils; still more preferably, about 2 mils. Preferably, ninth layer 69 comprises at least one member selected from die group consisting of polyolefin, polystyrene, polyamide, polyester, polymerized ethylene vinyl alcohol, polyvinylidene chloride, polyether, polyurethane, polycarbonate, and starch-containing polymer; more preferably, at least one member selected from the group consisting of polyolefin; still more preferably, at least one member selected from the group consisting of ethylene/ alpha-olefin copolymer, propylene/alpha-olefin copolymer, ethylene/unsaturated ester copolymer, and ethylene/ unsaturated acid copolymer; yet still more preferably, linear low density polyethylene.

Figure 7:
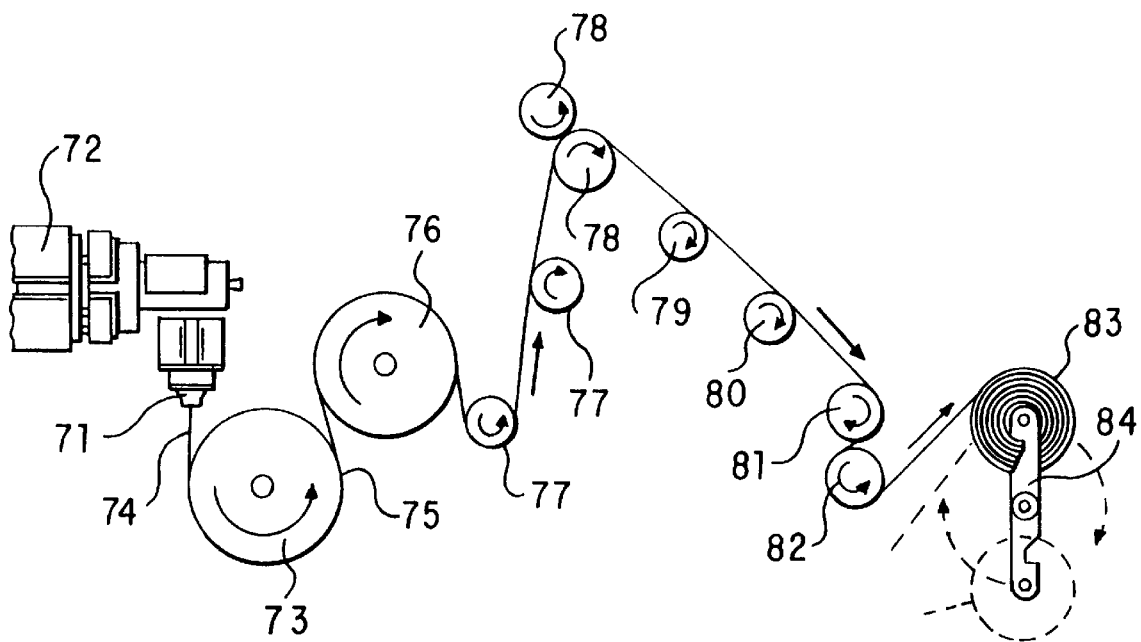
FIG. 7 illustrates a schematic view of a preferred process for making preferred multilayer films for use in the packaged product of the present invention.

The films of FIGS. 5 and 6 can be prepared in accordance with a cast coextrusion process as schematically illustrated in FIG. 7, in which the various polymeric formulations are supplied to slot-shaped die 71 from a plurality (preferably, from 3 to 10) of extruders 72, only one of which is illustrated in FIG. 7. The number of extruders 72 is at least as great as the number of different chemical compositions present in the various layers of the multilayer film, but can be fewer than the number of layers of die film in the event that a stream from an extruder is split to form two different film layers. Typically, die extruders are single screw extruders which convert polymer granules or pellets into a continuous uniform melt under elevated temperatures and pressure. The molten masses formed within the various extruders are converged into a plurality of layers in a stream which is forced into flat laminar flow for the width of the slot of die 71, and thereafter forced through the slot of die 71, to yield the desired shape. After passing through die slot of die 71, extruded melt stream 74 passes downward vertically and tangentially contacts chill roll 73 which quenches melt 74, forming multilayer film 75 thereon. Chill roll 73 is highly polished and water-cooled, and rotates with extruded melt stream 74 at the speed at which melt stream 74, and film 75, are forwarded. Film 75 then leaves the surface of chill roll 73, and thereafter may contact the surface of from one to three supplemental chill rolls 76 (only one supplemental chill roll 76 is illustrated in FIG. 7), which are also water-cooled and highly polished, and which further cool multilayer film 75, which thereafter passes over guide rolls 77 and through the nip of nip rolls 78. Film 75 is thereafter directed over guide rolls 79 and 80. Thereafter, film 75 passes between a nip between rubber nip roll 81 and stainless steel nip roll 82, and is then wound up into roll 83 by winder 84. The width of the cast film web is determined by the die slot width. The thickness of film 75 is determined by the relationship between the output of extruder 72 and the takeaway speed of the film 75.

Alternatively, oriented, heat shrinkable films useful in the present invention can be prepared in accordance with processes disclosed in U.S. application Ser. No. 08/539,919, to R. RAMESH, which is hereby incorporated in its entirety, by reference thereto.

Figure 8:
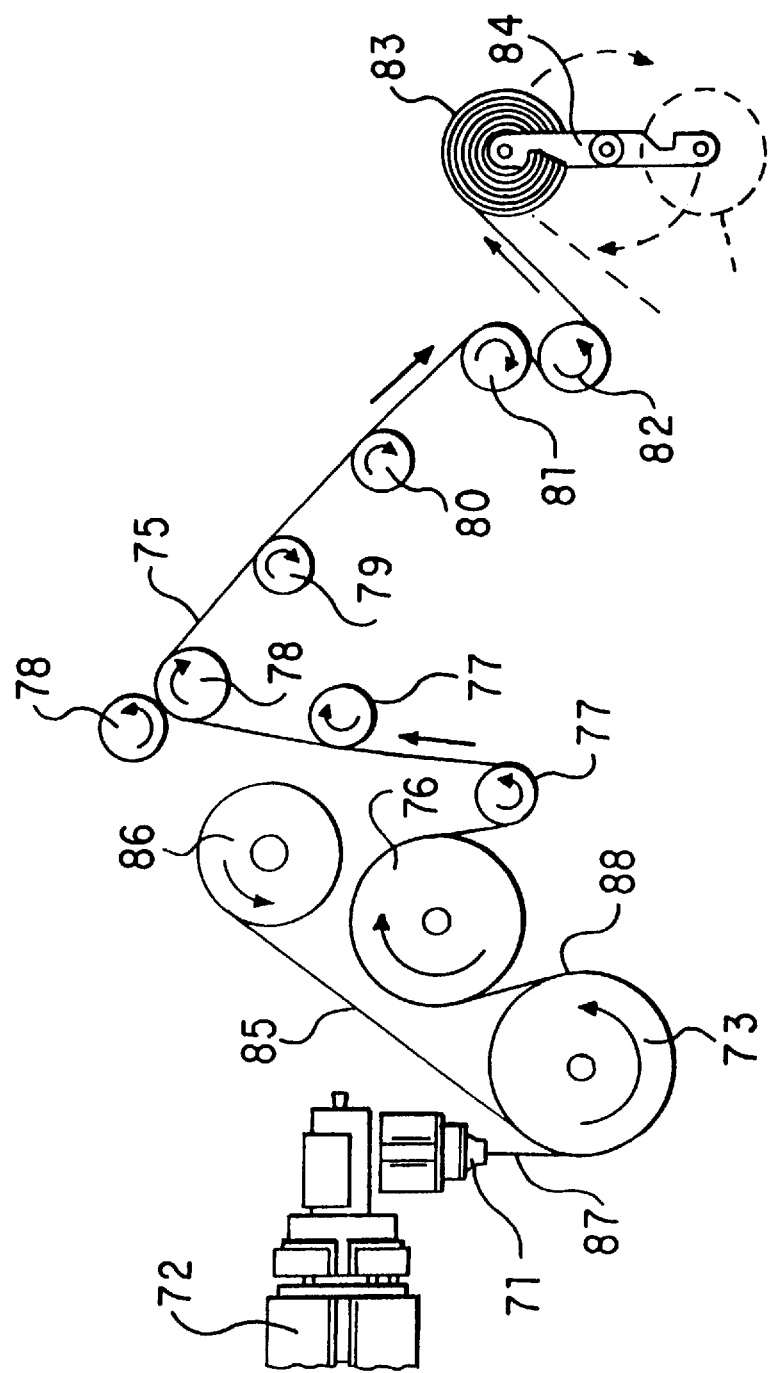
FIG. 8 illustrates a schematic view of an alternative preferred process for making preferred multilayer films for use in the packaged product of the present invention.

FIG. 8 illustrates a substrate/coating process for preparation of multilayer films, which can be, for example, the films illustrated in FIGS. 5 and 6. In FIG. 8, substrate film 85, supplied from roll 86, is directed onto chill roll 73 and coated with molten coating 87 passing vertically downward from slot die 71 towards chill roll 73, with molten coating 87 being forced through slot die 71 by extruder 72. Coating 87 is cooled by chill roll 73, the heat from coating 87 passing through substrate film 85 and into chill roll 73, to result in coated substrate 88. Furthermore, if additional downstream chill rolls are present, such as chill roll 76, further cooling can be effected by direct contact of coating 87 with the smooth surface of the supplemental chill roll, i.e., without substrate film 85 being between coating 87 and supplemental chill roll 76. Subsequent downstream processing of coated substrate 88 is the same as described in FIG. 7.

Preferably, the films of FIGS. 5 and 6 are prepared according to the process described in U.S. Pat. No. 4,287, 151, to ESAKOV, et. al., which is hereby incorporated in its entirety, by reference thereto, The films illustrated in FIGS, 5 and 6, and described in detail above, are preferably used in a packaging process employing a thermoforming step. Both a forming web and a non-forming web can be fed from two separate rolls, with the forming web being fed from a roll mounted on the bed of the machine for forming the package "pocket," i.e., the product cavity. The non-forming (lidstock) web is usually fed from a top-mounted arbor for completing the airtight top seal of the package. Each web has its meat-contact/sealant surface oriented towards the other, so that at the time of sealing, the sealant surfaces face one another. The forming web is indexed forward by transport chains, and the previously sealed package pulls the upper non-forming web along with the bottom web as the machine indexes.

The first step in the packaging process is the formation of the product cavity in the forming web. The cavity forming is a three-step process: index-heat-form. While one cavity, is being formed, the web for the next cavity is undergoing preheating before being indexed over the pocket-forming die. To accomplish this, the forming web is heated from 70° C. to 80° C. by being pressed against a contact-type heater by means of vacuum. The forming web is then formed by use of compressed air or vacuum, or both. Compressed air pushes the heated film into the die cavity from above and, in turn, vacuum pressure pulls the film into shape from within the die. A plug is used to assist the movement of the heated film into the die cavity.

After forming, the transport chains carry the empty pocket to the loading station where the product is either hand loaded or pumped into the cavity. The transport chains then carry the loaded product to the vacuum and sealing station.

The sealing process is a series of operations occurring simultaneously or with a slight overlap. Once the top film is in place over the filled cavity, the sealing chamber closes. Package air is exhausted between the top and bottom films. The upper chamber, or lid, employs a heated seal plate set at from 302°F. to 338° F., which bonds the non-forming web and the forming web together.

The vacuum in the seal die balances chamber pressures, and ensures that no air is trapped between the product and the forming web. The sealing diaphragms, empty of air, are now filled with compressed air. This presses the heated sealing plate against the upper film compressing the heat-sealable surfaces of the two webs between the sealing plate and the T-rubber sealing gasket. The heat and pressure of the sealing plate causes the two surfaces of the films to bond together sealing the product in a vacuum environment. Approximately 0.4 to 0.5 seconds after sealing ends, the upper and lower chambers are vented to the atmosphere, causing the top and bottom films to collapse around the product. Now, the sealing diaphragms evacuate and the sealing plate moves back up. Outside air rushes into the chambers. When the air pressures are equalized, the die bottom can move down, allowing the package to be indexed out of the seal station.

The sealed package is then separated from the web by way of a contour knife system. The packages are conveyed through a hot water (205° F.) shrink tunnel. The packages are placed on racks and cooked in a high humidity oven. The product is then chilled and available for shipping or for further processing, which may involve stripping the package off of the product.

The polymer components used to fabricate multilayer films according to the present invention may also contain appropriate amounts of other additives normally included in such compositions. These include slip agents such as talc, antioxidants, fillers, pigments and dyes, radiation stabilizers, antistatic agents, elastomers, and the like additives, as known to those of skill in the art of packaging films.

Although film useful in the present invention need not always be irradiated, in at least one preferred embodiment, the film is irradiated. In the irradiation process, the film is subjected to an energetic radiation treatment, such as corona discharge, plasma, flame, ultraviolet, X-ray, gamma ray, beta ray, and high energy electron treatment, which may alter the surface of the film and/or induce cross-linking between molecules of the irradiated material. The irradiation of polymeric films is disclosed in U.S. Pat. No 4,064,296, to BORNSTEIN, et. al., which is hereby incorporated in its entirety, by reference thereto. BORNSTEIN, et. al. discloses the use of ionizing radiation for crosslinkilig polymer present in the film.

Radiation dosages are referred to herein in terms of the radiation unit "RAD", with one million RADS. also known as a megarad, being designated as "MR", or, in terms of the radiation unit kiloGray (kGy), with 10 kiloGray representing 1 MR, as is known to those of skill in the art. To produce cross linking, the polymer is subjected to a suitable radiation dosage of high energy electrons, preferably using an electron accelerator, with a dosage level being determined by standard dosimetry methods. A suitable radiation dosage of high energy electrons is in the range of up to about 16–166 kGy, more preferably about 30–139 kGy, and still more preferably, 50–100 kGy. Preferably, irradiation is carried out by an electron accelerator and the dosage level is determined by standard dosimetry methods. However, other accelerators such as a Vander Graff or resonating transformer may be used. The radiation is not limited to electrons from an accelerator since any ionizing radiation may be used. A preferred amount of radiation is dependent upon the film and its end use.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness. As used herein, the term corona treatment also refers to all forms of plasma treatment.

Corona treatment of polymeric materials is disclosed in U.S. Pat. No. 4,120,716, to BONET, issued Oct. 17, 1978, herein incorporated in its entirety by reference thereto. BONET discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for die treatment of plastic webs for use in meat cook-in packaging, with the corona treatment of the inside surface of the web to increase the adhesion of the meat to die adhesion of the meat to the proteinaceous material.

Preferred meat products used in the packaged products in accordance with the present invention include high-fat/low-protein meat products such as sausage, braunschweiger, mortadella, bologna or certain hams (such as high water added hams). Preferably, the meat products comprise at least 3 weight percent fat, more preferably at least 5% fat, still more preferably, at least 7% fat, yet still more preferably, at least 9% fat, even more preferably at least 12% fat, and yet still more preferably, at least 15% fat. In some cases the meat product could have a fat content as high as 20%.

Preferably, the meat product used in accordance with the present invention has a protein content of less than 20%; more preferably, less than 15%; still more preferably less than 13%; yet still more preferably, less than 11%; even yet still more preferably, less than 9%; yet more preferably, less than 8%; and, yet even more preferably, less than 7%.

Figure 9:
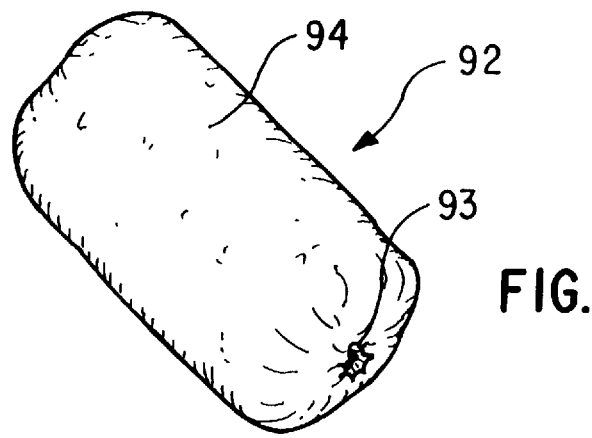
FIG. 9 illustrates a perspective view of a packaged product according to the present invention.

FIG. 9 illustrates one embodiment of a packaged product 92 of the present invention, the product being packaged in a casing closed by a pair of clips 93 at each end thereof, with only one clip being illustrated in the perspective view of FIG. 9. Film 94, used to package the meat product, can be, for example, multilayer film 13 illustrated in FIG. 2, or multilayer film 21 illustrated in FIG. 3, both of which are discussed in detail above, In FIG. 9, the cooked meat product preferably comprises ham, bologna, mortadella, sausage or braunschweiger, more preferably bologna, mortadella, and braunschweiger.

Figure 11:
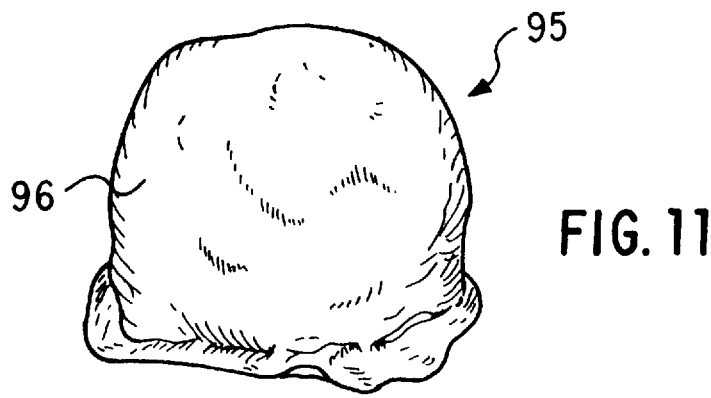
FIG. 11 illustrates a perspective view of another alternative packaged product according to the present invention.
Figure 10:
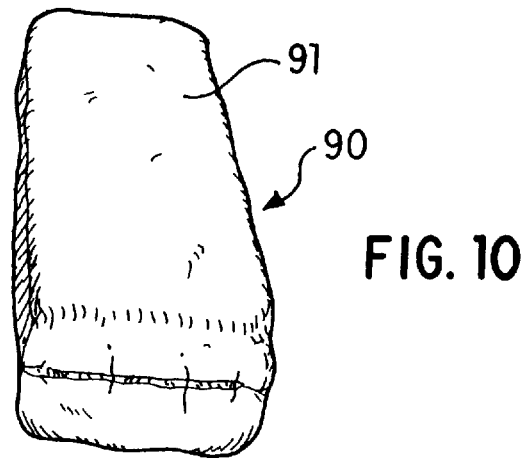
FIG. 10 illustrates a perspective view of an alternative packaged product according to the present invention.

FIG. 10 illustrates another embodiment of a packaged cooked meat product 90, according to the present invention. The product, a cooked meat product, is packaged in a heat-sealed, heat-shrinkable bag, within which the meat product has been cooked. The package comprises multilayer film 91, which can be, for example, multilayer film 13 illustrated in FIG. 2, or multilayer film 21 illustrated in FIG. 3, both of which are discussed in detail above. In FIG. 10, the cooked meat product preferably comprises pork, in the form of a boneless ham, FIG. 11 illustrates yet another embodiment of a packaged cooked meat product 95, according to the present invention. The product, a cooked meat product, is packaged in a heat-scaled, thermoformed web having a lidstock web sealed thereto, with the meat product being cooked within the sealed thermoformed package. The package comprises multilayer film 96, which can be, for example, multilayer film 50 illustrated in FIG. 5, or multilayer film 60 illustrated in FIG. 6, both of which are discussed in detail above. In FIG. 11, the cooked meat product preferably comprises ham.

The invention is illustrated by the following examples, which are provided for the purpose of representation, and are not to be construed as limiting the scope of the invention. Unless stated otherwise, all percentages, parts, etc. are by weight.

EXAMPLE 1

A 5¾" wide (lay flat dimension) tube, called a "tape", was produced by the coextrusion process described above and illustrated in FIG. 4, wherein the tape cross-section (from inside of tube to outside of tube) was as follows:

3.3 mils of EAA#1/
3.5 mils of a blend of EVA#1 & HDPE #1 (20%)/
0.9 mils of anhydride grafted LLDPE#1/
1.0 mils of EVOH/
1.7 mils of a blend of Nylon#1 (50%) and Nylon#2 (50%)/
1.6 mils of anhydride grafted LLDPE#1/
3.1 mils of EAA#2/
2.8 mils of LLDPE#2 wherein:

EAA#1 was 100% NUCREL® SEP 735-1 ethylene/acrylic acid copolymer obtained from E.I. DuPont de Nemours, of Wilmington, Del. NUCREL® SEP 735-1 ethylene/acrylic acid copolymer comprised a blend of 50% NUCREL® ARX 84-2 ethylene/acrylic acid copolymer with 50% NUCREL® 31001 ethylene/acrylic acid copolymer having about 9–10% acrylic acid mer content. Nucrel® ARX 84-2 ethylene/acrylic acid copolymer was a copolymer which had an acrylic acid mer content of 6.9% and a Vicat softening point of 207° F., which is significantly greater than 232–5.0 (percent acrylic acid mer content), the latter being about 195.5° F.

EVA#1 was PE 5269T (TM) ethylene vinyl acetate copolymer, obtained from Chevron Chemical Company of Houston, Tex.;

HDPE#1 is FORTIFLEX® J60-500C-147 high density polyethylene obtained from Solvay Polymers, Inc., Deer Park, Tex.:

LLDPE#1 was TYMOR 1203 linear low density polyethylene having an anhydride functionality grafted thereon, obtained from Morton International of Chicago ,Ill.;

EVOH was EVAL® LC-E105A polymerized ethylene vinyl alcohol, obtained from Eval Company of America, of Lisle, Ill.;

NYLON#1 was ULTRAMID® B4 polyamide 6, obtained from BASF corporation of Parsippany, N.J.;

NYLON#2 was GRILON® CF6S polyamide 6/12, obtained from EMS-American Grilon Inc., of Sumter S.C., LLDPE#2 was DOWLEX®2244A, linear low density polyethylenle, obtained from Dow Plastics, of Freeport, Tex;

EAA#2 was NUCREL® ARX 84-2 ethylene/acrylic acid copolymer, obtained from E.I. DuPont de Nemours, of Wilmington, Del.

All the resins were extruded at between 380° F. and 500° F., and the die was heated to approximately 420° F. The extruded tape was cooled with water and flattened, the flattened width being 5¾ inches wide in a lay-flat configuration. The tape was then passed through a scanned beam of an electronic cross-linking unit, where it received a total dosage of 50 Grays (kGy). After irradiation, the flattened tape was passed through hot water for about a third of a minute, the hot water having a temperature of from about 206° F. to 210° F. The resulting heated tape was inflated into a bubble and oriented into a film tubing having a lay-flat width of 16½ inches and a total thickness of about 2.3 mils. The bubble was stable and the optics and appearance of the film were good. The film tubing was determined to have about 20% free shrinkage in the longitudinal direction and about 30% free shrinkage in the transverse direction, when immersed in hot water for about 10 seconds, the hot water being at a temperature of 185° F. i.e., using ASTM method D2732-83.

The resulting tubing was slit into film. The film was folded longitudinally, i.e., along its length, about a forming shoe with opposed edges being joined by applying a heat seal longitudinally over the overlap to form a lap seal, done in a semi-continuous manner (called backseaming). The film backseamed acceptably. This tubing was then clipped at one end, filled with uncooked bologna from the open end, and clipped again to result in chubs. The chubs were then cooked in a high humidity environment from 145° F. to 170° F. for several hours. After chilling, the chubs were evaluated for purge-resistance and it was found that the chubs had no purge and there was a uniform coat of protein on the film upon stripping the meat from the film, thereby indicating an adequate level of film-to-meat adhesion. The food contact layer was the outer film layer which contained EAA#1.

Other samples of the backseamed tubing was also filled with uncooked liversausage and then clipped again to yield clipped chubs. These chubs were then cooked in a high humidity environment at from 145° F. to 170° F., for a period of several hours. After chilling, the chubs were evaluated for purge resistance and it was found that the chubs had no purge and there was a uniform coat of protein on the film upon stripping the meat from the film, thereby indicating an adequate level of film-to-meat adhesion. The food contact layer was the outer film layer which contained EAA# 1.

EXAMPLE 2

A 5¾" wide (lay flat dimension) tube, called a "tape", was produced by the coextrusion process described above and illustrated in FIG. 4, wherein the tape cross-section (from inside of tube to outside of tube) was as follows:

3.3 mils of EAA#3/
3.5 mils of a blend of EVA# 1 (80%) & HDPE #1 (20%)/
0.9 mils of anhydride grafted LLDPE#1/
1.0 mils of EVOH/
1.7 mils of a blend of Nylon#1 (50%) and Nylon#2 (50%)/
1.6 mils of anhydride grafted LLDPE#1/
3.1 mils of EAA#2/
2.8 mils of LLDPE#2 wherein:

EAA#3 was 100% NUCREL® SEP 735-2 ethylene/acrylic acid copolymer obtained from E.I. DuPont de Nemours, of Wilmington, Del. NUCREL® SEP 735-2 ethylene/acrylic acid copolymer comprised a blend of 35% NUCREL® ARX 84-2 ethylene/acrylic acid copolymer with 65% NUCREL® 31001 ethylene/acrylic acid copolymer having about 9–10% acrylic acid mer content. All other resins were as identified in Example 1 above.

A film was made by the coextrusion process described above in Example #1. This film was then backseamed in a fashion described above in Example #1. Several samples of backseamed tubing were then cooked with bologna in a fashion similar to that described above in Example 1. After chilling, the chubs were evaluated for purge resistance and it was found that the chubs had no purge and there was a uniform coat of protein on the film upon stripping the meat from the film, thereby indicating an adequate level of film-to-meat adhesion. The food contact layer was the outer film layer which contained EAA#3. The adhesion was comparable to that of the film in Example 1.

Other samples of backseamed tubing were then cooked with liversausage in a fashion similar to that described above in Example 1. After chilling, the chubs were evaluated for purge resistance and it was found that the chubs had no purge and there was a uniform coat of protein on the film upon stripping the meat from the film, thereby indicating an adequate level of film-to-meat adhesion. The food contact layer was the outer film layer which contained EAA#3. The adhesion was comparable to the film in Example 1.

EXAMPLE 3

A 3¾ wide (lay flat dimension) tube, called a "tape", was produced by the coextrusion process described above and illustrated in FIG. 4, wherein the tape cross-section (from inside of tube to outside of tube) was as follows:

2.8 mils of EAA #2/

3.3 mils of a blend of EVA#1 (80%) & HDPE#1 (20%)/

0.9 mils of anhydride grafted LLDPE#1/

1.8 mils of a blend of Nylon#1 (50%) and Nylon#2 (50%)/

1.1 mils of EVOH/

1.6 mils of anhydride grafted LLDPE#1/

2.2 mils of a blend of EVA # 1 (80%) and HDPE #1[20%]/

3.1 mils of LLDPE#2 wherein all the resins are as identified in Example 1 above.

A film was made by the coextrusion process described above in Example #1 to obtain 9¾" tubing. This film was then backseamed in a fashion described above in Example #1. A few samples of backseamed tubing were then cooked with bologna in a fashion similar to that described above in Example 1. After chilling, the chubs were evaluated for purge resistance and it was found that the chubs had no significant purge and there was a uniform coat of protein on the film upon stripping the meat from the film, thereby indicating an adequate level of film-to-meat adhesion. The food contact layer was the outer film layer which contained EAA#2.

EXAMPLE 4 (comparative)

A 5½ wide (lay flat dimension) tube, called a "tape", was produced by the coextrusion process described above and illustrated in FIG. 4, wherein the tape cross-section (from inside of tube to outside of tube) was as follows:

2.8 mils of a blend of LLDPE #2 (70%) and EAA #4 (30%)/

3.6 mils of a blend of EVA #1 (80%) & HDPE #1 (20%)/

0.7 mils of anhydride grafted LLDPE#1/

1.7 mils of a blend of Nylon #1 (50%) and Nylon #2 (50%)/

1.0 mils of EVOH/

1.4 mils of anhydride grafted LLDPE # 1/

2.8 mils of blend of EVA # 1 (80%) & EAA #4 (20%)/

3.0 mils of LLDPE #2 wherein:

EAA #4 was PRIMACOR® 1410 ethylene/acrylic acid copolymer comprising 9.5% acrylic acid, obtained from Dow Plastics of Freeport, TX. EAA #4 had a Vicat softening point of 178° F. which is less than 232–5.0 (percent acrylic acid mer content). All other resins were as identified in Example 1 above.

A film was made by the coextrusion process described above in Example #1 to obtain a film tubing having a 14-inch lay-flat width. This film was then backseamed in a fashion described above in Example #1. Several of the resulting backseamed casings were then cooked with bologna in a fashion similar to that described above in Example 1. After chilling, the chubs were evaluated for purge resistance. It was found that the adhesion to the meat was not very good. The adhesion was very spotty and very minuscule and there was purge in several locations. The adhesion appeared to be significantly less than that of the films of Examples 1–3, based on protein coverage and overall evaluation of cook-loss (the surface comprising EAA #4 was the food-contact layer).

Other samples of backseamed tubing were then cooked with liversausage in a fashion similar to that described above in Example 1. After chilling, the chubs were evaluated for purge resistance. It was seen that the adhesion to the meat was not very good. The adhesion was spotty and there were areas of fat-out. Thus, the adhesion appears to be significantly less than that of the films of Examples 1–3, based on protein coverage and overall evaluation of cook-loss (the surface comprising EAA #4 was the food contact layer).

The film of this example was also corona treated (to about 62 dynes/cm) and then backseamed. Several of the resulting corona-treated backseamed casings were stuffed with bologna, and several others with liversausage, following which the stuffed casings were cooked in a manner similar to that described above in Example 1. After cooking followed by chilling, the chubs were evaluated for purge resistance. For both sets of chubs, it was found that the while the adhesion to the meat was good, there was purge/fat-out of the meat at the casing layflat edges (a 2–4 mm wide streak) where the forming shoe used in the backseaming process had rubbed off the corona treatment from the casing layflat edges (the surface comprising EAA #4 was the food-contact layer). Thus, the end result was considered to be an unacceptable product.

EXAMPLE 5 (Comparative)

Samples of commercial CN510 [TM] casing were stuffed with bologna and thereafter cooked in a manner similar to that described above in Example 3. CN510 [TM] casing comprised SURLYN® 1650, obtained from E.I. DuPont de Nemours, of Wilmington, Del., as the food-contact layer. SURLYN® 1650 has been used for several years for meat-adhesion to ham and poultry and is known for that. SURLYN® 1650 is a Zn neutralized NUCREL® (ethylene/methacrylic acid copolymer comprising 12% methacrylic acid mer), with a Vicat softening point of 163° F., which is less than [232–5.0 (percent acrylic acid mer)]. After cooking and chilling, the chubs were evaluated for purge resistance. It was found that the adhesion to the meat was not very good. The adhesion was very spotty and minuscule and there was purge in several locations. Thus, the adhesion level appears to be significantly less than that of the film in Example 3, based on protein coverage and overall evaluation of cook-loss.

Samples of CN510 were also cooked with liversausage in a manner similar to that described above in Example 1. After chilling, the chubs were evaluated for purge resistance. It was seen that the adhesion to the meat was not very good. The adhesion was spotty and there were areas of fat-out and purge. Thus, the adhesion of the SURLYN® ionomer resin sealant appears to be significantly less than that of the films of Examples 1–3, based on protein coverage and overall evaluation of cook-loss.

The results disclosed in Examples 1–5, above, indicate die superior meat-adhesion characteristics of NUCREL® ARX 84-2 ethylene/acrylic acid copolymer to meat products such as bologna and mortadella, as when compared to SURLYN® ionomer resin and a conventional PRIMACOR® ethylene/acrylic acid resin. This is an unexpected result, for at least three reasons. First, ethylene/methacrylic acid copolymers (e.g. NUCREL® ethylene/methacrylic acid copolymer resins), ethylene/acrylic acid copolymers (e.g. PRIMACOR® ethylene/acrylic acid resins) and their metal-salt neutralized grades (e.g. SURLYN® ionomer resins) have been known for several years to be the best of the knows meat-adhering polyolefin materials. Metal-salt-neutralized ethylene/methacrylic acid copolymers (e.g. the SURLYN® 1650 ionomer resin used in CN510 (TM) film), especially have been the subject of wide commercial use in cook-in applications. However, NUCREL® ethylene/methacrylic acid copolymer resin, PRIMACOR® ethylene/acrylic acid resin, and even SURLYN® ionomer resin, have been known to have unacceptable adhesion to products such as liversausage, bologna and mortadella, as confirmed in Example 5 above. Thus, the enhanced adhesion obtained by a different type of ethylene/acrylic acid copolymer would not be expected and is surprising.

Second, the level of film-to-meat adhesion is surprising and unexpected because the percent acrylic acid mer content of the above-identified NUCREL® ARX 84-2 ethylene/acrylic acid copolymer is significantly lower than that of SURLYN® 1650 ionomer resin. [See FIG. 12 for a comparison of the percent acrylic acid mer.] It has previously been believed that the higher the acid content, the better the adhesion. Thus, the discovery that a new ethylene/acrylic acid copolymer incorporating only 6.9% acrylic acid mer content has significantly higher adhesion than a metal-salt-neutralized ionomer resin with 12% methacrylic acid, or a PRIMACOR® ethylene/acrylic acid copolymer with 9.5% acrylic acid, is surprising and unexpected.

Third, the level of film-to-meat-adhesion is surprising because wider certain circumstances, it is believed that the orientation of the functional groups of the meat-contact surface are such that the groups point inwards into the surface rather than away from the surface, in an effort to minimize the free energy. In these situations, the meat-contact layer provides much reduced adhesion to the meat because there are relatively fewer polar groups available to bind to the meat during the cooking process. However, this is not evidenced with the meat-contact surfaces of Examples 1–3.

While it is not completely understood why the enhanced film-to-meat adhesion was obtained in the films of Examples 1–3, it is believed that film-to-meat adhesion could be influenced not only by the polymer microstructure and physical properties such as Vicat softening point and melting point, but also by other parameters, such as degree of orientation, degree of irradiation, degree of heat-shrinkability, cooking conditions (time, temperature, and environment), and degree of crystallinity, among other factors.

The Vicat softening point of NUCREL® ARX 82-2 ethylene/acrylic acid copolymer (207° F.) was higher than the other prior art ethylene/acrylic acid copolymers e.g., PRIMACOR® 1321 ethylene/acrylic acid copolymer, which comprises about 6.5% acrylic acid mer. Also, the NUCREL® ARX 82-2 ethylene/acrylic acid copolymer (density 0.935 g/cc) is more crystalline than PRIMACOR® 1321 ethylene/acrylic acid copolymer (density 0.935 g/cc). However, in spite of the higher Vicat softening point of the NUCREL® ARX 82-2, and its higher crystallinity, orientability of the NUCREL®ARX 82-2 ethylene/acrylic acid copolymer was found to be acceptable. This is unexpected because the more crystalline the polymer and the higher the Vicat softening point, the more one would expect the polymer to be difficult to orient.

Although the present invention has been described with with reference to particular means, materials, and embodiments, it should be noted that the invention is not to be limited to the particulars disclosed, and extends to all equivalents within the scope of the claims.

What is claimed is:

1. A packaged product comprising a film configured around a cooked meat product, the cooked meat product being adhered to a meat-contact surface of the film, wherein the meat-contact surface of the film comprises an olefin/acrylic acid copolymer having a Vicat softening point, in °F., of at least:

232–5.0×(percent acrylic acid mer in the copolymer), and
     wherein the cooked meat product comprises at least one
     member selected from the group consisting of sausage,
     bologna, mortadella, braunschweiger, and ham.

2. The packaged product according to claim 1, wherein the olefin comprises ethylene, and the cooked meat product comprises at least one member selected from the group consisting of sausage, bologna, mortadella, braunschweiger, and ham-and-water product.

3. The packaged product according to claim 2, wherein the ethylene/acrylic acid copolymer has a Vicat softening point, in °F., of at least:

232–5.0×(percent acrylic acid mer in the copolymer), and
     the ethylene/acrylic acid copolymer comprises acrylic
     acid mer or methacrylic acid mer in an amount of from
     about 1 to 30 percent, based on the weight of the
     copolymer.

4. The packaged product according to claim 3, wherein the ethylene/acrylic acid copolymer has a Vicat softening point, in °F., of at least:

232–5.0×(percent acrylic acid mer in the copolymer), and
     the ethylene/acrylic acid copolymer comprises acrylic
     acid mer in an amount of from about 3 to 20 percent,
     based on the weight of the copolymer.

5. The packaged product according to claim 4, wherein the ethylene/acrylic acid copolymer has a Vicat softening point, in °F., of at least:

232–5.0×(percent acrylic acid mer in the copolymer), and
     the ethylene/acrylic acid copolymer comprises acrylic
     acid mer in an amount of from about 5 to 15 percent,
     based on the weight of the copolymer.

6. The packaged product according to claim 5, wherein the film is a multilayer film and wherein the olefin/acrylic acid copolymer is present in a first film layer, and wherein the multilayer film further comprises a second layer comprising at least one member selected from the group consisting of polyolefin, polystyrene, polyamide, polyester, polymerized ethylene vinyl alcohol, polyvinylidene chloride, polyether, polyurethane, polycarbonate, and starch-containing polymer.

7. The packaged product according to claim 6, wherein the film further comprises a third layer between the first layer and the second layer, the third layer serving as an $O_2$-barrier layer and comprising at least one member selected from the group consisting of polymerized ethylene/vinyl alcohol copolymer, polyvinylidene chloride, polyamide, polyalkylene carbonate and polyester.

8. The packaged product according to claim 6, wherein:

the second layer comprises a polyamide; and the film further comprises a core third layer, between the first layer and the second layer, comprising at least one member selected from the group consisting of ethylene vinyl alcohol copolymer and ethylene/alphaolefin copolymer.

9. The packaged product according to claim 8, wherein the film further comprises:

a fourth layer between the first layer and the third layer, the fourth layer comprising at least one member selected from the group consisting of polyolefin, polystyrene, polyamide, polyester, polymerized ethylene vinyl alcohol, polyvinylidene chloride, polyether, polyurethane, polycarbonate, and starch-containing polymer; and a fifth layer between the first layer and the fourth layer, the fifth layer serving as a tie layer and comprising anhydride-grafted polyolefin.

10. The packaged product according to claim 9, wherein the film further comprises:

a sixth layer which is an outer film layer and which comprises polyamide; and a seventh layer which serves as a tie layer and which is between the second layer and the sixth layer.

11. The packaged product according to claim 10, wherein the film further comprises:

an eighth layer between the sixth layer and the seventh layer, the eighth layer comprising polyamide; and a core ninth layer, between the first layer and the fifth layer, comprising at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer.

12. The packaged product according to claim 7, wherein:

the second layer comprises at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer.

13. The packaged product according to claim 12, wherein the film further comprises a fourth layer between the second layer and the third layer, the fourth layer serving as a tie layer and comprising at least one member selected from the group consisting of modified ethylene/alpha-olefin copolymer, modified ethylene/unsaturated ester copolymer, modified ethylene/unsaturated acid copolymer, polystyrene and polyurethane.

14. The packaged product according to claim 13, wherein the film further comprises:

a fifth layer between the first layer and the third layer, the fifth layer comprising at least one member selected from the group consisting of polyolefin, polyamide, polyester, and polyurethane; and a sixth layer between the third layer and the fifth layer, the sixth layer serving as a tie layer, the sixth layer comprising at least one member selected from the group consisting of modified ethylene/alpha-olefin copolymer, modified ethylene/unsaturated ester copolymer, modified ethylene/unsaturated acid copolymer, polystyrene and polyurethane.

15. The packaged product according to claim 14, wherein the meat-contact surface of the film is corona treated.

16. The packaged product according to claim 14, wherein the meat-contact layer is sealed to itself.

17. The packaged product according to claim 14, wherein the second layer is an outer layer and the meat-contact layer is sealed to the second layer.

18. The packaged product according to claim 17, wherein the second layer is corona treated.

19. The packaged product according to claim 14, wherein the fifth layer comprises at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer.

20. The packaged product according to claim 14, wherein the film further comprises:

a seventh layer comprising at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer; and an eighth layer comprising at least one member selected from the group consisting of polyamide, polyester and thermoplastic elastomer.

21. The packaged product according to claim 20, wherein the eighth layer comprises at least one member selected from the group consisting of polyamide 6, polyamide 11 polyamide 12, polyamide 66, polyamide 69, polyamide 610, polyamide 612, polyamide 6I, polyamide 6T, MXD6, and copolymers thereof.

22. The packaged product according to claim 21, wherein the eighth layer comprises polyamide 6.

23. The packaged product according to claim 20, wherein the film is biaxially oriented.

24. The packaged product according to claim 23, wherein the film has a transverse direction free shrink of less than 10 percent at a temperature of 185° F.

25. The packaged product according to claim 23, wherein the film has a machine direction free shrink of at least 10 percent at a temperature of 185° F., and a transverse direction free shrink of at least about 10 percent at a temperature of 185° F.

26. The packaged product according to claim 25, wherein the film is at least partially cross-linked.

27. A process comprising:

(A) packaging a meat product in a package by encasing the meat product in a film, wherein the meat-contact surface of the film comprises an olefin/acrylic acid copolymer having a Vicat softening point, in °F., of at least:

232×5.0×(percent acrylic acid mer in the copolymer), and wherein the cooked meat product comprises at least one member selected from the group consisting of sausage, bologna, mortadella, braunschweiger, and ham-and-water product; and (B) cooking the meat product within the film so that the meat-contact surface of the film adheres to the meat product.

28. A process comprising:

(A) packaging a meat product in a hermetically heat-sealed, biaxially oriented film, wherein the meat-contact surface of the film comprises an olefin/acrylic acid copolymer having a Vicat softening point, in °F., of at least:

232−5.0×(percent acrylic acid mer in the copolymer), and wherein the cooked meat product comprises at least one member selected from the group consisting of sausage, bologna, mortadella, braunschweiger, poultry, and ham;

(B) cooking the meat product within the film so that the meat-contact surface of the film adheres to the meat product.

29. The process according to claim 28, wherein the film has a machine direction free shrink of at least 10 percent at a temperature of 185° F., and a transverse direction free shrink of at least about 10 percent at a temperature of 185° F.

30. The process according to claim 29, wherein the film is a multilayer film and the olefin/acrylic acid copolymer is present in a first film layer which makes up at least 10 weight percent of a total weight of the multilayer film.

31. The process according to claim 30, wherein the film is at least partially cross-linked.

32. The process according to claim 30, wherein the olefin/acrylic acid copolymer comprises ethylene/acrylic acid copolymer comprising less than 10% acrylic acid mer and wherein an external surface of the cooked meat product has been subjected to a temperature of at least 160° F. for at least 30 minutes.

33. The process according to claim 32, wherein the first film layer further comprises antioxidant.

* * * * *